United States Patent [19]
McDermott

[11] Patent Number: 5,051,545
[45] Date of Patent: Sep. 24, 1991

[54] DIGITIZER WITH SERPENTINE CONDUCTOR GRID HAVING NON-UNIFORM REPEAT INCREMENT

[75] Inventor: Robert M. McDermott, Weston, Conn.

[73] Assignee: Summagraphics Corporation, Seymour, Conn.

[21] Appl. No.: 505,944

[22] Filed: Apr. 6, 1990

[51] Int. Cl.⁵ ............................................. G08C 21/00
[52] U.S. Cl. .................................................... 178/19
[58] Field of Search ...................... 178/18, 19; 364/520

[56] References Cited

U.S. PATENT DOCUMENTS

| | | |
|---|---|---|
| 3,399,401 | 8/1968 | Ellis et al. . |
| 3,466,646 | 9/1969 | Lewin . |
| 3,573,755 | 4/1971 | Ellis et al. . |
| 3,647,963 | 3/1972 | Bailey . |
| 3,705,956 | 12/1972 | Dertuzos . |
| 3,819,857 | 6/1974 | Inokuchi . |
| 3,873,770 | 3/1975 | Ioannou . |
| 3,904,822 | 9/1975 | Kamm et al. . |
| 4,014,015 | 3/1977 | Gunlach . |
| 4,029,899 | 6/1977 | Gordon . |
| 4,079,627 | 3/1978 | Gundlach . |
| 4,110,556 | 8/1978 | Hawkes . |
| 4,368,352 | 1/1983 | Davis et al. . |
| 4,378,465 | 3/1983 | Green et al. . |
| 4,418,242 | 11/1983 | Kouno . |
| 4,471,162 | 9/1984 | Aono et al. . |
| 4,552,991 | 11/1985 | Hulls . |
| 4,570,033 | 2/1986 | Hulls . |
| 4,705,919 | 11/1987 | Dhawan . |
| 4,729,108 | 3/1988 | Uchiyama . |
| 4,734,546 | 3/1988 | Landmeier . |
| 4,794,209 | 12/1988 | Asada et al. . |
| 4,831,216 | 5/1989 | Landmeier . |
| 4,835,347 | 5/1989 | Watson . |

OTHER PUBLICATIONS

Soviet Journal of Instrumentation and Control, No. 8, Aug. 1969.

Primary Examiner—Stafford D. Schreyer
Attorney, Agent, or Firm—Rosen, Dainow & Jacobs

[57] ABSTRACT

Disclosed herein are position determining apparatus and conductor structures or grids therefor. The conductor structure for each axis includes a number of conductors, at least one of which is run in a serpentine path with a non-uniform repeat increment. The repeat increment, which is the spacing between one run and the next of the same serpentine conductor, is constrained by a maximum repeat increment, or a minimum repeat increment, or a maximum change in repeat increments between consecutive runs of a same conductor, or combinations thereof. In the preferred embodiments, there is at least a constraint on the maximum repeat increment to provide noise immunity. The conductors are arranged for each axis of the grid in a pattern such that signals obtained for that axis may be processed to provide binary members in a Gray-type code each unique to a small region of the active area in which the coil center is located. The small region for a given axis corresponds to the space between two immediately adjacent, active conductor portions for that axis, with a possible ambiguity of one space. Smal regions in each axis define the coarse location of the coil center. Fine location within a region may be determined from the magnitudes of currents induced in selected runs by interpolation, or from the phase relationship of current induced in selected runs.

66 Claims, 10 Drawing Sheets

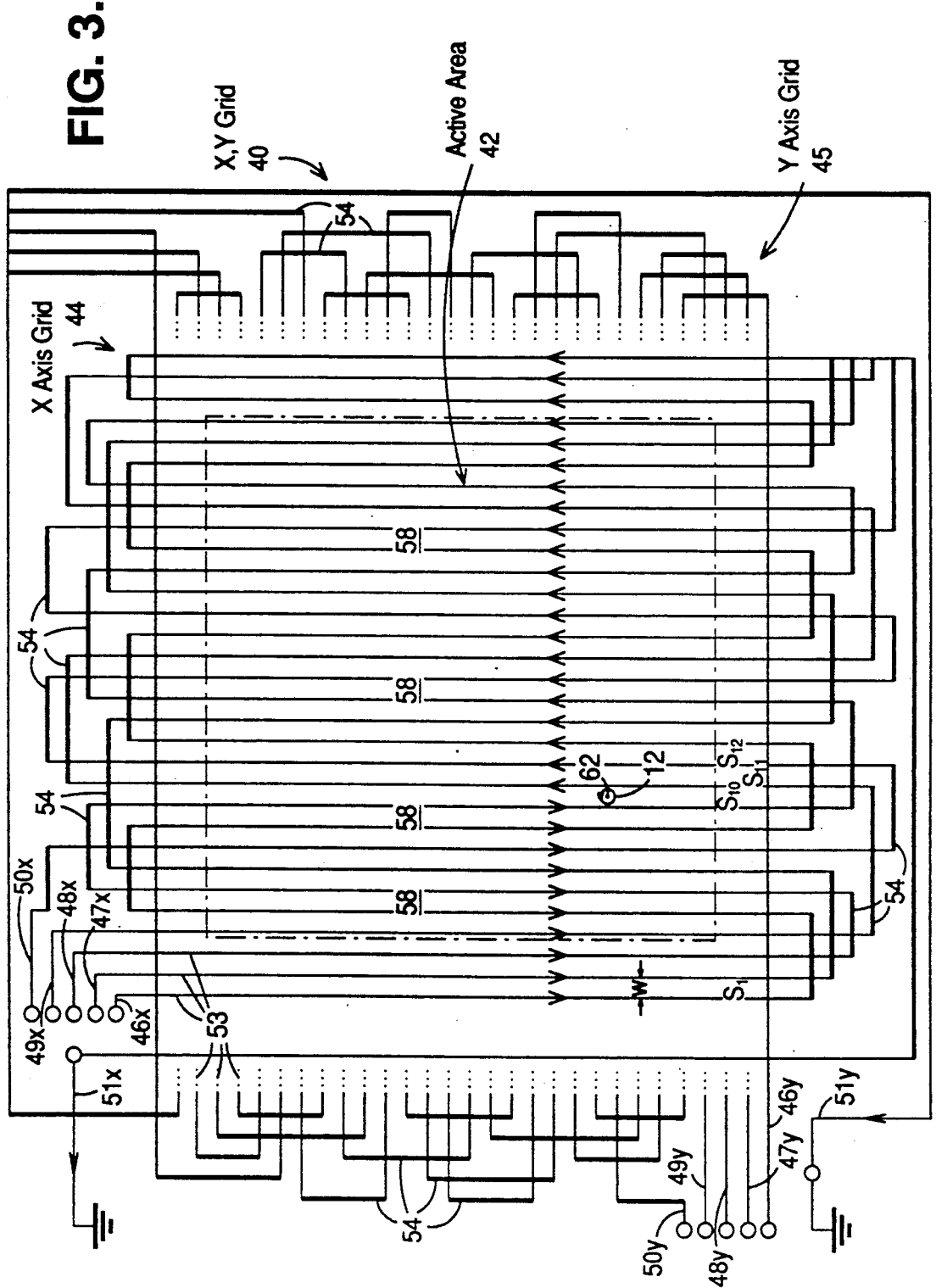

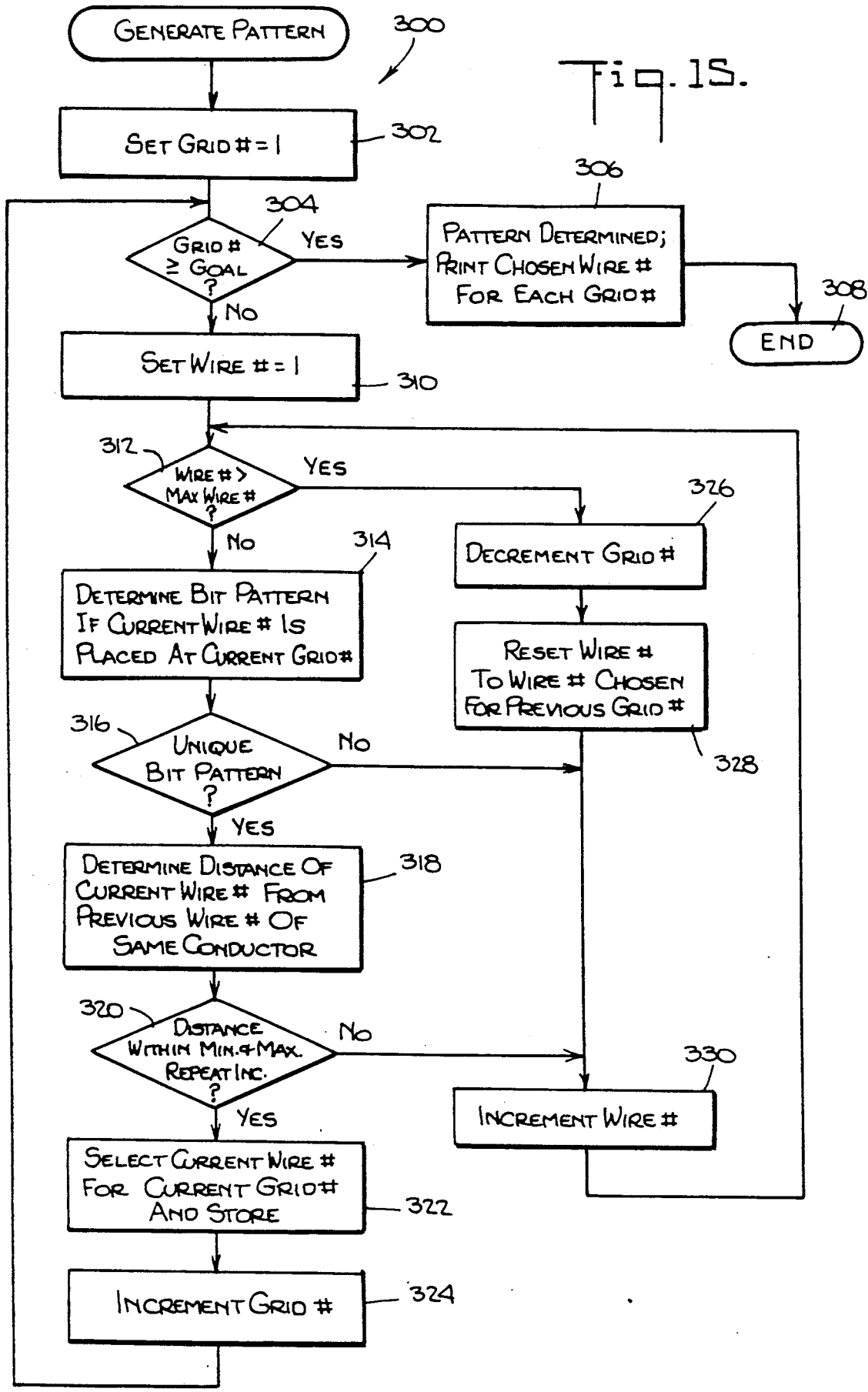

DIGITIZER WITH SERPENTINE CONDUCTOR GRID HAVING NON-UNIFORM REPEAT INCREMENT

BACKGROUND OF THE INVENTION

The invention disclosed herein relates to position determining devices, systems and methods, particularly to digitizer systems of the type including a tablet having a conductor structure which interacts with a movable element or pointer suchas a stylus or cursor and the like to provide signals, particularly for a computer, representing the position of the movable element relative to the tablet.

Digitizer systems having a conductor structure and a movable element may be of the electromagnetic type in which signals are electromagnetically coupled between electrical conductors in the conductor structure and an electrical conductor such as a coil in the movable element; of the capacitive or electrostatic type in which signals are capacitively coupled between electrical conductors in the conductor structure and an electrical conductor such an electrode in the movable element; of the optical type in which signals are optically coupled between a light emitting or light receiving conductor structure and light receiving or light emitting structure in the movable element, respectively; of the sonic type in which signals are coupled by means of sound waves between a sound emitting or sound receiving conductor structure and sound receiving or sound emitting structure in the movable element, respectively; etc. The terms "conductor structure" and "conductor" as used herein are meant in a broad sense, and such a conductor structure or conductor may receive or conduct signals of an electrical, magnetic, optical, sonic, etc., nature. Similarly, "induced" is meant in a broad sense and means signals present in a conductor by virtue of some form of coupling.

Digitizing systems provide signals, typically for use by computers, representing the location, e.g., coordinates, of the movable element relative to an active area of the conductor structure, the active area simply being that area at the tablet surface in which the digitizing system is active to provide such position-representing signals at a given accuracy, resolution, etc. Outside the active area, the digitizing system may not recognize or not process signals for conversion to position-representing signals, or may simply not be active to generate or receive such signals, etc. Digitizing systems typically include a conductor structure for each coordinate axis. Description below with respect to the conductor structure of one axis of a coordinate system is generally applicable to the conductor structures of the other axis.

Electromagnetic-type digitizer systems are disclosed, for example, in U.S. Pat. Nos. 3,873,770 of Ioannou; 3,904,822 of Kamm et al.; and 4,368,352 of Davis, all of which are assigned to the assignee of this application.

An electrostatic digitizer system is disclosed, for example, in U.S. Pat. No. 4,705,919 of Dhawan.

The conductor structure in those types of systems comprise, for each coordinate axis, a number of conductors each of which is switched to either couple signals received by the conductors from the movable element to common processing circuitry, or to energize the conductors so that signals thereon supplied from a common source may be coupled to the movable element. Thus, a switch is required for each conductor of the conductor structure of each axis. Although the number of conductors that must be switched depends upon a number of factors including desired resolution and tablet size, it is not unusual for a tablet to employ four or more conductors per linear inch per axis, i.e., adjacent conductors are spaced 0.025 inch or less apart. Therefore, a tablet having an active area of only 12 inches by 12 inches may employ 48 or more conductors per axis requiring 48 or more switches per axis. Typically, the switches are embodied in a multiplexer, and six or more 8-input or three or more 16-input multiplexers are employed per axis.

One way to reduce the overall number of switches or multiplexer inputs required for each axis in digitizer systems of the above type while maintaining a given active area and a given conductor spacing, is to traverse the active area for a particular axis a number of times with the same conductor, i.e., run the conductor in a serpentine fashion such that active portions or "runs" of the conductor are run back and forth across the active area interconnected by connecting portions outside the active area. Recent disclosures of serpentine pattern conductor structures may be found, for example, in U.S. Pat. Nos. 4,734,546, issued Mar. 29, 1988, and 4,831,216, issued May 16, 1989, both of Landmeier; and 4,835,347 of Watson, issued May 30, 1989.

Digitizer systems employing serpentine pattern conductor structures are not, however, a recent development. See, for example, U.S. Pat. Nos. 3,466,646 of Lewin, issued Sept. 9, 1969; 3,647,963 of Bailey, issued Mar. 7, 1972, assigned to the assignee of this application; 3,705,956 of Dertouzos, issued Dec. 12, 1972; 3,819,857 of Inokuchi, issued June 25, 1974; 4,029,899 of Gordon issued June 14, 1977; 4,378,465 of Green et al., issued Mar. 29, 1983; and 4,552,991 of Hulls, issued Nov. 12, 1985.

Arranging the conductors in a serpentine pattern so that spaces or regions between conductor runs (or the runs themselves) may be uniquely identified by unique binary numbers, e.g., in a Gray-type code, also is not a new development. See, for example, the '646 Lewin Patent (1969), the '956 Dertouzos Patent (1972) and the '857 Inokuchi Patent (1974).

One approach in digitizer systems employing serpentinetype grid conductors is to successively divide the active area into smaller and smaller regions. Thus, for example, one conductor divides the tablet in a given axis in half, another conductor in quarters, another in eighths, etc. With three conductors, a tablet may be divided according to this approach into eighths, with four conductors into sixteenths, with five conductors, into thirty-seconds. See, for example, the Inokuchi '857 Patent.

Using the above approach, the conductor that divides the active area in half, for a 12 inch tablet, separates the adjacent active portions or runs of that conductor by six inches. For a 24 inch tablet, the active portions of the conductor dividing the tablet in half are 12 inches apart. To operate with large spaces between conductor active portions while providing unambiguous signals induced in either the grid conductors or the movable element conductor, requires one or more of the following: high signal levels; a large conductor in the movable element; or sensitive processing circuitry.

Another approach is to divide the tablet area into halves, quarters, etc., as above described, but using a plurality of runs of the same conductor in each subdivided portion of the tablet, rather than only one conductor run per tablet half, tablet quarter, etc. See the Lewin '646 Patent cited above. Since in this approach the individual runs of the same conductor are not widely separated, the digitizer system does not require the higher signal levels, larger movable element conductor or sensitive processing circuitry of the approach discussed above. However, with a given spacing between adjacent conductor runs of all conductors (said given spacing being referred to herein as "basic spacing"), using a number of runs of the same conductor in the same sub-divided tablet portion simply reduces the total number of unique spaces that can be identified with a given number of conductors.

Typically, grid conductor structures for electromagnetic digitizer systems have four or more separate conductors or conductor active portions per inch of active area. Therefore, a tablet having an active area of 12 inches along a particular axis requires at least 48 conductors or conductor active portions. A tablet using serpentine conductor approaches described above then requires six serpentinely run conductors ($2^6 = 64$). Since digital circuits typically are configured to handle data and addresses in 4, 8, 16 or 32 bits, eight conductors and 8-bit multiplexers would be used. Similarly, for larger tablets, more than eight conductors are needed, and a 16-bit multiplexer (or two 8-bit multiplexers) per axis would be used.

However, 8 or 16 conductors arranged in particular conductor patterns as taught in the Lewin '646 Patent results in a pattern having less than the maximum possible number of unique spaces that can be defined with a given basic conductor run spacing and a given number of conductors. On the other hand, using a pattern as taught in the Inokuchi '857 Patent in a large tablet presents the ambiguity problem discussed above caused by large spaces between conductor runs of the conductor that divides the active area in half or in quarters, etc.

In the approach disclosed in the Landmeier '546 Patent cited above, 16 conductors per axis are run in serpentine paths such that the tablet is uniquely divided only into quarters. A coil in the movable element is uniquely locatable within a tablet quarter from unique codes obtained from the signal phases on the 16 conductors. Signal processing then identifies two adjacent conductor active portions between which, or on one of which, the center of the coil is located. Further signal processing then locates the center of the coil as being between, or on one of, the two adjacent conductor active portions. Thus, determining the location of a coil with respect to the grid is a three-step process per axis. See the Landmeier '216 and the Watson '347 for other approaches using serpentine grid conductor structures.

There is however a need for digitizer systems and digitizer conductor (grid) structures which employ a reduced number of connections between the conductor structure and the signal processing circuitry, whose conductor patterns may be determined relatively easily, which locate a movable element with respect to two conductors with simplified processing, and which perform, for example, with acceptable resolution and accuracy.

OBJECTS AND SUMMARY OF THE INVENTION

It is an object of the invention disclosed in this application to simplify and/or reduce the cost of position determining apparatus, particularly large area apparatus.

It is another object of the invention to improve and/or simplify conductor structures and/or signal processing circuitry for use in position determining apparatus.

It is another object of the invention to provide improved conductor structures which require a reduced number of switches or multiplexer inputs between the respective conductor structure and signal processing or conductor energizing circuitry, for use in position determining apparatus.

It is another object of the invention to provide conductor structures and signal processing circuitry for large area position determining apparatus, e.g., apparatus having an active position determining area in one axis of up to 48 inches or more.

It is another object of the invention to simplify methods for processing signals associated with such conductor structures to obtain signals representing the position of the movable element relative to the conductor structure.

It is another object of the invention to provide apparatus and methods which simplify determination of the position of a movable element relative to a conductor structure of the apparatus.

It is another object of the invention to provide a method for determining conductor patterns for such conductor structures.

A conductor structure or system (sometimes referred to hereafter as a "grid") embodying the invention includes, for each axis, a number of conductors, at least one of which is run in a serpentine path with a non-uniform repeat increment. A conductor run in such a serpentine path includes for a given axis spaced active portions or runs which are substantially parallel to each other running substantially parallel to the axis, and connecting portions interconnecting the active portions. The repeat increment is simply the spacing between one run and the next of the same serpentine conductor, and may (but need not, depending on factors such as noise immunity and fine position determination accuracy) be constrained by a maximum repeat increment, or a minimum repeat increment, or a maximum change in repeat increments between consecutive runs of a same conductor, or combinations of a maximum repeat increment, a minimum repeat increment and a maximum change in consecutive repeat increments.

The conductor structure may comprise at least first, second and third conductors each of which includes a plurality of active portions extending substantially in a first direction substantially in or adjacent a common plane substantially parallel to each other. The repeat increments of at least one of the conductors are non-uniform. The conductors are electrically insulated or spaced from each other, for example, by extending in different, closely-spaced planes which are insulated in whole or part from each other, and/or by insulating crossover points of adjacent conductors, and/or by selecting conductor patterns, etc.

The repeat increments of the conductors are preferably selected such that the maximum repeat increment is less than about one half of the extent of the conductor structure (the conductor structure having an extent in a second direction that is different from the first direction). For example, each conductor may have at least three active portions.

The repeat increment of the at least one serpentine conductor may be non-uniform throughout, or at least in the position-determining portion of the conductor structure, i.e., the portion of the conductor structure relative to which the location of the movable element is to be determined with relatively good accuracy. The repeat increment of the at least one conductor may change any number of times over the full extent of the conductor.

In the preferred embodiments, there is at least a constraint on the maximum repeat increment to provide noise immunity, as described below.

The conductors are arranged for an axis of the grid in a pattern such that signals obtained for that axis from the conductors or from a conductor in the movable element (e.g., functioning as a coil at the frequency of interest) may be processed to provide binary numbers each unique to a small region of the active area in which a reference point (e.g., coil center) of the movable element is located. Alternatively, the signals may uniquely represent an individual conductor run on or adjacent to which the reference point of the movable element is located, i.e., a conductor run adjacent to the small region. The small region for a given axis corresponds to the space between two immediately adjacent, active conductor portions for that axis, with a possible ambiguity of one space.

Thus, in the X axis, for example, the small region is a narrow rectangle or strip extending between two adjacent X-axis active conductor portions. The binary numbers representing adjacent small regions of a given axis (or adjacent conductor runs) differ by a single binary bit, i.e., only one bit changes if the conductor of the movable element is moved along the given axis past a conductor run from one small region to the adjacent small region. Thus, the binary numbers form a type of a Gray code with a possible ambiguity of one bit. The binary numbers defining the small region for the X axis grid and the small region for the Y axis grid define a smaller region bounded on opposite sides by the conductor runs of the respective axis (or the binary numbers define the point of intersection of an X axis run and a Y axis run). These small regions in each axis, or the smaller regions for the two axes, define coarse locations of the movable element. Fine location within a region may be determined from the magnitudes of signals induced in selected runs by interpolation, or from the phase relationship of signals induced in selected runs.

The number of conductors and the number of conductor runs of conductor structures according to the invention depend on, among other things, the desired active area of the tablet and the desired resolution. If properly laid out in accordance with the invention, n serpentine conductors with $2^n$ conductor runs will provide up to $2^n - 1$ unique regions between adjacent conductor runs. However, if rigid constraints are placed on the repeat increments for the conductors, the uniquely identifiable regions resulting from a given number of conductors will be less than $2^n - 1$. For example, a relatively large minimum repeat increment and/or a relatively small maximum repeat increment, i.e., the permissible variation of the repeat increment between a minimum and a maximum is small, may result in a number of uniquely identifiable regions which is substantially less than $2^n - 1$. In the limiting case where the minimum repeat increment equals the maximum repeat increment (i.e., the repeat increment is the same for all conductors and does not vary), only 2n uniquely identifiable regions may be defined.

For example, five conductors with 32 ($2^5$) conductor active portions will provide up to 31 ($2^5 - 1$) unique regions if the conductors are laid out in accordance with the invention. With a spacing of 0.250 inch between conductor active portions, an eight-inch grid span may be obtained.

With respect to maximum repeat increment, since the amplitude or magnitude (absolute value) of signal induced in (or by, depending on whether the system is movable element driven or conductor structure driven) runs of a serpentine conductor decreases with increasing distance in both directions away from the reference point of the movable element, the expected induced signal in adjacent runs for given signal levels must be significantly greater than the expected noise level. Therefore, a maximum distance is imposed on the spacing between adjacent runs of the same conductor.

With respect to the minimum repeat increment, the primary constraint thereon is that adjacent runs of the same conductor should be spaced so that the signal phase changes in a particular conductor as the movable element is moved past only one of the two adjacent runs of that same conductor. Another minimum repeat increment criterion relates to fine position determination. For, example, where mathematical interpolation is used, as described below, the repeat increment should be large enough to provide good linearity of signal level vs. distance between the signal induced in two conductor runs used for interpolation. Maintaining such linearity enables the fine position to be determined directly from a mathematical operation performed directly on current magnitudes, as opposed to first performing a mathematical operation on signal values (e.g., forming a ratio) and then using the result of the mathematical operation with a look-up table to obtain the interpolated fine position.

Conflicting goals are presented between maximum and minimum repeat increments, i.e., to minimize errors, the minimum repeat increment is set as large as possible, and as close as possible to the maximum repeat increment (i.e., minimize the change in repeat increments between consecutive runs of the same conductor); and, for noise immunity, the maximum repeat increment is set as small as possible.

The following relates to the constraint on maximum change in repeat increment. In most areas of a serpentine grid tablet, the total amplitude of the induced signal is the individual contributions of multiple conductor runs. For conductor runs that are equidistant from the reference point of the movable element, the induced signals are equal and opposite, and cancel. In such a case, the conductors equidistant from the movable element reference point make no contribution to the total of the induced signal, which introduces no interpolation error. Thus, interpolation may be facilitated and interpolation accuracy may be improved by spacing the conductor runs immediately adjacent each side of the run closest to the movable element reference point equidistantly therefrom. However, since the conductors are fixed and the movable element is movable, the conductor runs immediately adjacent the one closest to the movable element reference point will seldom be equidistant from the reference point. In accordance with the invention, however, it is possible to minimize the unequal spacing or imbalance of the two immediately adjacent conductor runs from the movable element reference point. This is accomplished in accordance with the invention by imposing a constraint on the maximum change in repeat increment from run to run of the conductors.

As indicated above, fine position may be determined by interpolation. Alternatively, two grid conductors may be extended with the same repeat interval, and the fine position may be determined by the phase of induced signals as disclosed in the Bailey ,963 Patent cited above. The use of two such conductors relieves somewhat the minimum repeat increment constraint.

A conductor structure according to the invention for a position-determining device which includes a movable element and determines the location of the movable element relative to the conductor structure, comprises at least three conductors each of which includes a plurality of, preferably at least three, active portions or runs extending substantially in a first direction substantially in or adjacent a common plane substantially parallel to each other. The conductors each have repeat increments which space adjacent active portions of the same conductor, and means couple the spaced active portions of same conductors in series. The conductors are arranged in a pattern such that: spaces between the active portions of all of the conductors (or each of the conductor active portions) may be uniquely identified by a unique binary number, respective binary digits of each of the unique binary numbers corresponding to respective conductors, whereby upon interaction between the movable element and respective conductors binary logic signals may be obtained corresponding to the binary digits which are indicative of the location of the movable element relative to the conductor structure; and the repeat increment of at least one of the conductors is nonuniform.

Stated another way, adjacent active portions of the same conductor are separated by first spaces and adjacent active portions of all of the conductors are separated by second spaces, and the spaced active portions of same conductors are coupled in series. The conductors are arranged in a pattern such that: at least two of the first spaces between adjacent active portions of at least one of the conductors are different; and each of the second spaces between adjacent active portions of all of the conductors (or the conductor runs themselves) may be uniquely identified by a unique binary number, respective binary digits of each of the unique binary numbers corresponding to respective conductors, whereby upon interaction between the movable element and respective conductors binary logic signals may be obtained corresponding to the binary digits which are indicative of the location of the movable element relative to the conductor structure.

The repeat increment, or first spaces, of the at least one conductor may, but need not, be constrained by a maximum repeat increment (first space), or by a minimum repeat increment (first space) or a maximum change in repeat increments (first spaces) between consecutive runs of a same conductor, all selected, for example, as described herein, or combinations thereof.

Preferably, the repeat increment (first space) is less than one-half of the extent of the conductor structure for noise immunity.

In the preferred embodiments, the repeat increment (first space) is constrained by a maximum value for noise immunity, and by a minimum value such that the phase of the induced signals changes as the movable element is moved past a conductor run. Where mathematical interpolation is to be employed for fine position determination, the minimum repeat increment (first space) is further constrained to provide substantially linear signals for interpolation, and the maximum change in consecutive repeat increments (first spaces) is restrained.

A conductor system according to the invention for a position-determining device which includes a movable element and determines the location of the movable element relative to the conductor system, comprises first and second conductor structures as described above, one for each axis.

Apparatus according to the invention for determining the location of a movable element relative to a given area, comprises: a conductor structure or system as described above which interacts with the movable element when the movable element is on or adjacent the given area and upon energization of at least one of the conductor structure (system) and the element; means for energizing one of the conductor structure (system) and the movable element to cause location-determining signals to be present in the other; and means for processing the location-determining signals in the other of the conductor structure (system) and the movable element. The processing means includes first means for obtaining from the location-determining signals binary signals corresponding to the binary digits which identify the spaces between all conductor runs (second spaces) or the conductor runs, and which are indicative of the location of the movable element relative to the given area.

A conductor system according to the invention for a position-determining device which includes a movable element and determines the location of the movable element relative to the conductor system comprises first and second conductor structures as described above for the first conductor structure, one for each axis.

In the preferred embodiments, for each of the first and second conductor structures, the second spaces (or basic spacing) between adjacent conductor active portions of all conductors of the respective conductor structure are equal; two adjacent active portions of the same conductor are separated by at least one active portion of another conductor; and the processing means includes means for storing sets of binary numbers corresponding to locations of the movable element relative to the given area, and means for comparing the stored sets of binary numbers and the binary numbers obtained from the binary signals to determine the location of the movable element relative to the given area.

According to one embodiment, the first means of the processing means determines a coarse location of the movable element from the binary numbers. The coarse location corresponds to a location of the movable element, with respect to each of the conductor structures, between two conductor active portions, i.e., in a second space. The processing means includes second means for determining a fine location of the movable element, with respect to each of the conductor structures, between the two conductor active portions or on one of them. For each of the conductor structures, the processing means in a preferred embodiment provides the amplitudes of the position-determining signals, and the second means performs a mathematical interpolation from selected amplitudes of selected position-determining signals.

According to another embodiment, two conductors of the first and second conductor structures each have a plurality of active portions which are equally spaced with respect to adjacent active portions of both of the two conductors and which are equally spaced with respect to active portions of the same conductor. The second means processes the position-determining signals in the two additional conductors for each of the first and second conductor structures to determine the fine location.

A method according to the invention determines a layout of a conductor structure of n conductors having the characteristics described above. The method comprises: (1) inserting into the layout one of the conductors at a time such that at least two of the first spaces between adjacent active portions of at least one of the conductors are different; (2) after each conductor is inserted into the layout, determining whether selected conditions are satisfied; (3) if selected conditions are satisfied in step (2), repeating steps (1) and (2) for the next conductor until n conductors have been inserted into the layout; if selected conditions are not satisfied in step (2), then removing the last conductor inserted into the layout and then repeating steps (1) and (2) for another conductor laid out differently from the removed conductor.

A method according to the invention for determining the location of a movable element relative to a conductor structure of the types described above which interacts with the movable element when the movable element is adjacent the conductor structure upon energization of at least one of the conductor structure and the movable element, comprises: energizing one of the conductor structure and the movable element; and processing signals obtained from the other of the conductor structure and movable element to provide a unique binary number which uniquely identifies a space or at least one conductor active portion close to the movable element. A fine location may then be determined using, for example, magnitude interpolation or the phase relationship of signals on the conductors.

The above and other objects, aspects, features and advantages of the invention will be more readily perceived from the description of the preferred embodiments thereof taken in conjunction with the accompanying drawings and appended claims.

BRIEF DESCRIPTION OF THE DRAWINGS

The invention is illustrated by way of example and not limitation in the figures of the accompanying drawings in which like references denote the same or corresponding parts, and in which:

FIG. 3 is a schematic view of both axes of a five conductor per axis grid structure according to the invention;

FIG. 15 is a flow chart illustrating selection of serpentine grid conductor patterns in accordance with the invention.

DESCRIPTION OF THE PREFERRED EMBODIMENTS

Figure 1A:
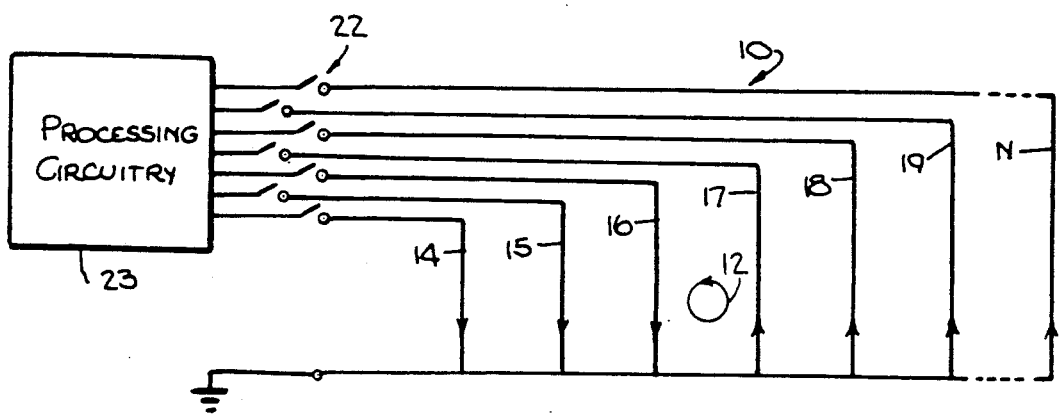
FIGS. 1A and 1B are schematic diagrams of a conventional electromagnetic-type digitizer grid showing the phases of the currents induced in the grid conductors for two locations of a coil relative to the grid.

The digitizer system and the conductor structures and systems illustrated in the drawings and described below are of the electromagnetic type. However, the invention is not limited to such digitizers systems and such conductor structures and systems. In an electromagnetic system, the conductors of the conductor structure or grid are electrical conductors, the conductor in the movable element is a an inductor or coil, and the movable element reference point is the center of the coil.

Figure 1B:
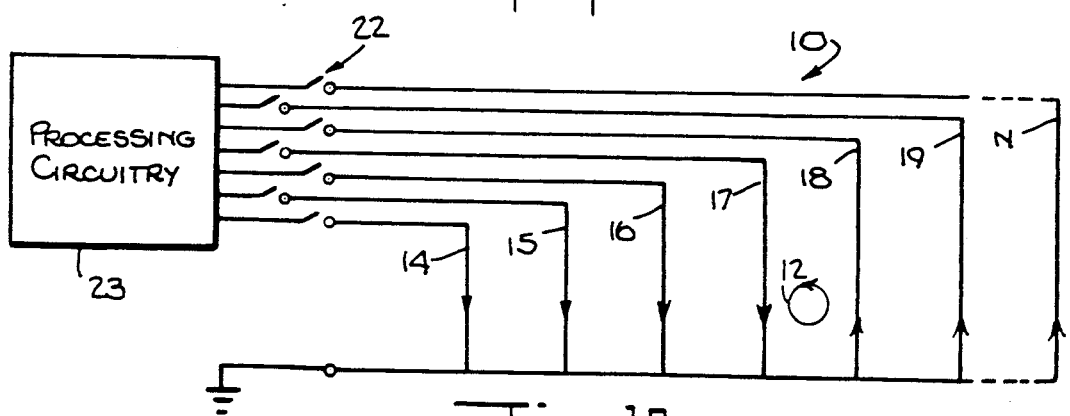

FIGS. 1A and 1B depict a portion of the X-axis grid 10 of a conventional electromagnetic-type digitizer system of the type in which a coil 12 in a cursor or stylus (not shown) energized by an ac signal induces currents in the individual grid conductors 14, 15, 16, 17, 18, 19, ... N. Each conductor 14-N crosses the active area once, so that separate conductors are required, as shown. The current in conductors 14-N is sensed by sequentially closing respective switches 22 to sequentially couple each conductor to processing circuitry 23. The position of the center of a coil 12 relative to grid 10 may be determined from the phase (direction) and/or magnitudes of the currents induced in the grid conductors 14-N. In that type of digitizer system, the currents induced in the conductors on one side of coil 12 have one phase while the currents induced in the conductors on the other side of coil 12 have the opposite phase. For example, with the center of coil 12 positioned between conductors 16 and 17, and current flowing counterclockwise in coil 12, as shown by the arrow associated with coil 12 in FIG. 1A, the current direction in conductors 14-16 is down and the current direction in conductors 17-N is up. With the center of coil 12 between conductors 17 and 18 and coil current counterclockwise, as depicted in FIG. 1B, the current direction in conductors 14-17 is up and the current direction in conductors 18-N is down. The magnitudes of the currents depend upon the relative closeness of the coil to the respective conductors. The prior art discloses a number of techniques for uniquely determining the position of coil 12 relative to grid 10 using such current phases and/or magnitudes.

FIGS. 1A and 1B (and FIGS. 2A, 2B, 3, 7 and 8) for simplicity show the diameter of coil 12 to be less than the spacing between adjacent grid conductors. While coil 12, particularly when it is disposed in a cursor, may have a diameter larger than the spacing between adjacent grid conductors, a current phase analysis similar to that described above may be used to locate the center of the coil relative to grid 10.

Figure 2A:
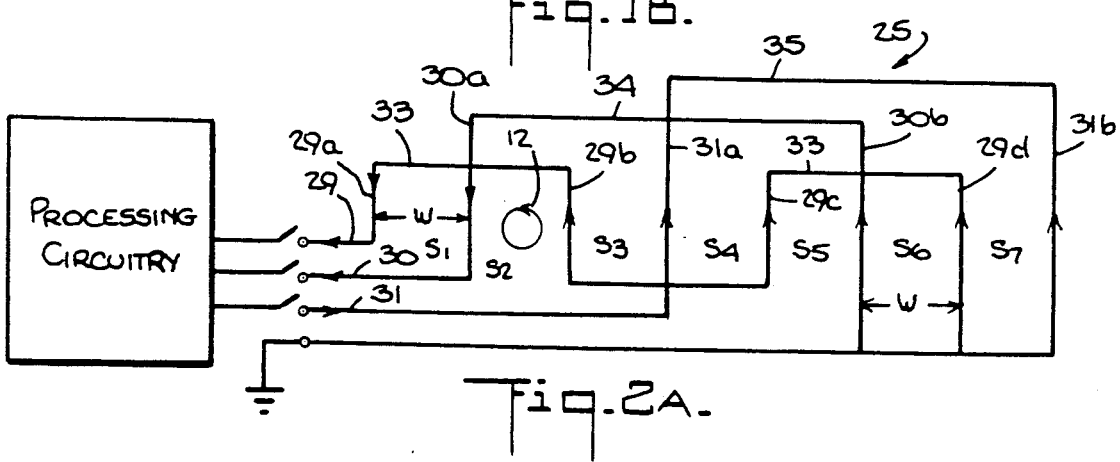
FIGS. 2A and 2B are schematic diagrams of a conventional electromagnetic-type digitizer grid having three serpentine grid conductors showing the phases of the currents induced in the grid conductors for two locations of a coil relative to the grid.
Figure 2B:
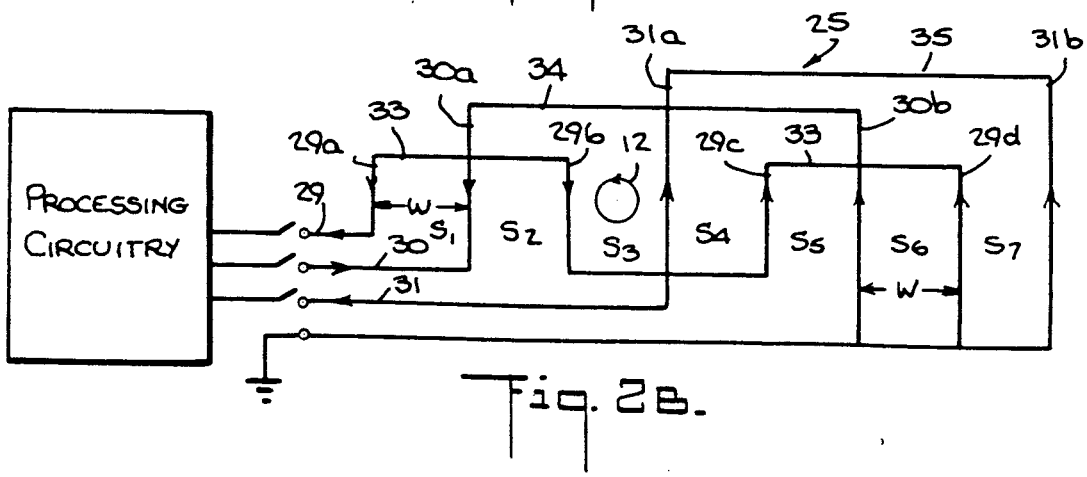

In FIGS. 2A and 2B, X axis grid 25 includes three conductors 29-31 each run in a serpentine path, and each having a plurality of parallel, spaced active conductor portions or runs 29a, 29b, 29c, 29d; 30a, 30b; 31a, 31b, running in opposite directions and interconnected by connecting portions 33, 34, 35, respectively, running perpendicular to the active portions. The basic conductor spacing "W" between runs of all conductors is uniform, and the repeat increment for each conductor is constant, although the repeat increments for different conductors may be different. The X axis grid 25 depicted in FIGS. 2A and 2B is configured and operated similar to the one depicted in FIG. 7 of U.S. Pat. No. 3,705,956 of Dertouzos, mentioned above, to locate the position of the center of coil 12 relative to grid 25, except that in FIGS. 2A and 2B, coil 12 is energized to induce currents in grid 25, while in FIG. 7 of the Dertouzos '956 Patent, the grid conductors are energized to induce currents in the coil. The net amplitude or magnitude of the current induced in a particular conductor is the sum of the individual currents induced in the individual conductor active portions, the conductor active portion closest to the coil providing the greatest contribution to the net current summation for that conductor.

For example, in FIG. 2A where the center of coil 12 is in space $S_2$ between conductor active portions 30a and 29b, the net current induced in conductor 29 is the summation of the individual currents induced in conductor active portions 29a, 29b, 29c and 29d, with conductor portion 29b providing the greatest contribution since it is the closest to coil 12 of the conductor active portions of conductor 29. (Conductor portions 29a and 29c make approximately equal but opposite contributions to the net current, and conductor portion 29d is relatively far from coil 12.) As such, the phase of the current induced in conductor 29 is determined by the current induced in conductor portion 29b. Similarly, the currents induced in conductor portions 30a and 31a make the greatest contribution to the net current in conductors 30 and 31, respectively. In FIG. 2B where the center of coil 12 is in space $S_3$ between conductor portions 29b and 31a, conductor portions 29b, 30a and 31a make the greatest contributions to the current in the respective conductors.

By assigning a binary logic level to the net current phase in each conductor, and forming binary numbers from the logic levels obtained from the net current phases in all of the grid conductors when coil 12 is energized, a binary number is obtained which uniquely identifies two conductor active portions between which, or on one of which, coil 12 is located. (Alternatively, the binary number may identify a conductor run.) For example when the center of coil 12 is located in space $S_2$ between conductor active portions 30a and 29b and for a counterclockwise energizing current in coil 12, as depicted in FIG. 2A, the net current phase is out of conductors 29 and 30, and into conductor 31. By assigning the binary logic level "0" to net current out of a conductor, the net currents induced in conductors 31-29, respectively, produce the binary number "100", which uniquely identifies space $S_2$ between conductor active portions 30a and 29b (or one of the conductor active portions 30a or 29b). In FIG. 2B, the center of coil 12 located in space $S_3$ between conductor active portions 29b and 31a with a counterclockwise energizing current induces currents to produce the binary number "101". Processing circuitry 37 processes the signals received from conductors 29-31 and provides signals representing the position of the center of coil 12 relative to X grid 25.

The seven binary numbers identifying the seven spaces $S_1$-$S_7$ between adjacent conductor active portions form a Gray-type code given in Table I below (with the conductor order being "31, 30, 29").

TABLE I

| Space | Code |
|---|---|
| $S_1$ | 110 |
| $S_2$ | 100 |
| $S_3$ | 101 |
| $S_4$ | 001 |
| $S_5$ | 000 |
| $S_6$ | 010 |
| $S_7$ | 011 |

The description above demonstrates operation of a serpentine grid digitizer system for coarse coil location. Interpolation may be used to locate the coil center within a space between adjacent conductor active portions or on a conductor active portion. Further description of serpentine grid patterns and operation thereof to obtain the location of the coil relative thereto is found in the above-cited patents. However, as mentioned above with respect to the prior approaches, as the number of conductors and the number of coarse locations increase, either the number of unique spaces that may be identified with a given conductor run spacing and a given number of conductors is reduced, or the distance between adjacent active conductor portions becomes too large so as to present signal level or noise problems.

In accordance with the invention, n serpentine conductors are laid out with with the repeat increment of at least one of the conductors being non-uniform, at least in the position-determining portion of the grid to provide up to $2_n - 1$ uniquely identifiable spaces in a serpentine grid system.

FIG. 3 shows a grid system 40 incorporating the invention for an approximately six inch by six inch active area 42. Grid 40 includes an X axis grid 44 and a Y axis grid 45, each comprising five conductors 46x-50x and 46y-50y. Conductors 51x and 51y are common returns for the X axis grid 44 and the Y axis grid 45, respectively. Conductors 46x-50x and 46y-50y are coupled to respective inputs of respective multiplexers (not shown), generally as shown in FIG. 9A or 9B and discussed below in connection with the X axis grid shown in FIG. 8. Since the X axis grid 44 and the Y axis grid 45 may be the same, the following description of the X axis grid 44 applies also to the Y axis grid 45.

Each of the X axis conductors 46x-50x includes a plurality of spaced, parallel active portions or runs 53 extending in the Y direction. The active portions of the Y axis grid conductors extend in the X direction normal to the X axis active portions, and the X axis and Y axis grid conductors are insulated from each other. Adjacent active portions 53 of each conductor are connected by connecting portions 54 which extend in the X direction outside of active area 42. The active portions 53 of all conductors 46x-50x are spaced by spaces 58 (second spaces). Each of conductors 46x-50x and 46y-50y are electrically insulated from each other by extending them in different closely-spaced planes that are insulated in known manner from each other. The different conductors of a same axis may be insulated from each other in other ways, e.g., at the crossover or intersecting points. It is preferred that the conductor runs of all conductors be uniformly spaced. However, they need not be. Uniform spacing is preferred because it facilitates fine location determination using interpolation techniques. Thus, with reference to FIG. 3, the "basic" spacing 58 between runs of all conductors 46x-50x is uniform. Each individual conductor 46x-50x is run in a serpentine path from one side of X axis grid 44 to the other. (However, it is not necessary that all conductors in a particular grid be run in a serpentine fashion, and a grid may include non-serpentinely run conductors.) Each conductor 46x-50x includes from five to eight active portions 53, and the X axis grid 44 laid out as shown in FIG. 3 has a total of 31 active portions, only 25 of which lie in active area 42. Thus, active area 42 for the X axis includes twenty-four spaces 58.

In order to uniquely identify in a Gray-type code each of the spaces 58 of the X axis grid 44 in active area 42 (or the conductor runs), with a constraint on the maximum repeat increment for each conductor in accordance with the invention, at least one of conductors 46x-50x has a non-uniform spacing (first spaces) between its active portions 53, i.e., at least one of those conductors is run in a serpentine path with a non-uniform repeat increment. In the particular embodiment depicted in FIG. 3, all of conductors 46x-50x have a non-uniform repeat increment. The repeat increments of conductors 46x-50x may be determined manually or with computer assistance using, for example, the algorithm flow charted in FIG. 15. Patterns of five serpentine conductors other than the one depicted in FIG. 3, with a constraint on the maximum repeat increment of the conductors, will provide up to thirty-one uniquely identifiable regions or spaces 58 (or conductor runs) in a Gray-type code.

A constraint on the minimum conductor repeat increment is also preferably imposed in accordance with the invention, as discussed herein.

A constraint is also preferably imposed in accordance with the invention on the maximum change permitted in repeat increment from one run to the next consecutive run of any conductor.

The repeat increments for the embodiment depicted in FIG. 3 are set forth in Table II below. The maximum repeat increment is 7 and the minimum repeat increment is 3. To minimize nonlinearity in connection with mathematical interpolation, conductor run imbalance is held to a minimum, i.e., the maximum change in the repeat increment between consecutive runs of the same conductor is limited to 2, i.e., the repeat increment may change by 1 or 2 from one run to the next consecutive run of any same conductor. The actual spacing between adjacent active portions 53 of the same conductor is a multiple of the basic spacing 58 between adjacent active portions 53 of all conductors. Thus, for a basic spacing 58 of 0.250 inch, a repeat increment of 4 equals one inch.

TABLE II

| Conductor | Repeat Increment |
| --- | --- |
| 46x | 4, 4, 4, 5, 4, 4, 3 |
| 47x | 5, 7, 6, 7 |
| 48x | 3, 4, 5, 6, 4, 3 |
| 49x | 7, 6, 7, 6 |
| 50x | 4, 4, 3, 4 |

Constraints on the maximum and minimum repeat increments, and for the maximum change in repeat increment between consecutive runs of the same conductor for serpentine grid conductor structures according to the invention are determined in consideration of the following.

Figure 4:
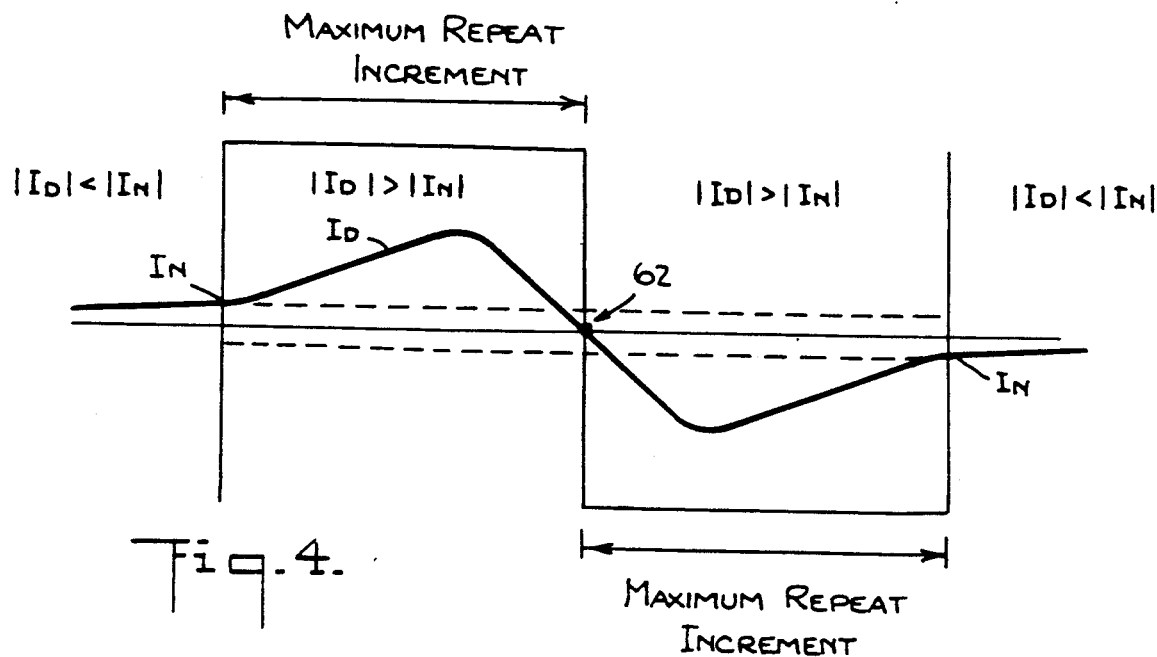
FIG. 4 is a schematic diagram showing current induced in a serpentine grid conductor as a function of the distance of the conductor runs of the same conductor from the center of a coil which interacts with the conductor, which is referred to in connection with a description of how the maximum repeat increment is determined for a serpentine conductor according to the invention.

With respect to maximum repeat increment, referring to FIG. 4, the amplitude or magnitude (absolute value) of current $I_D$ induced in (coil driven) or by (grid driven) serpentine conductor 60 decreases with increasing distance in both directions away from the center 62 of coil 12. If the closest run or active portion of a conductor is at distance D from the center 62 of coil 12, the current magnitude $|I_D|$ induced in that conductor run for given signal levels must be significantly greater than the expected noise level, $|I_N|$, e.g., $|I_D|$ must be greater than $|I_N|$. The maximum distance D is selected for "one sided current", i.e., current induced in a conductor in the beginning and ending areas of the grid where the coil center 62 may be located on one side of one run of a conductor, rather than between two runs of the same conductor. Since in most of the active area, the center 62 of coil 12 will be between two runs of the same conductor, and the induced current will be additive from the two runs between which the coil center is located, an even greater noise margin is provided.

With respect to the minimum repeat increment, the primary constraint thereon is that adjacent runs of the same conductor should be spaced so that the current phase changes in a particular conductor as the coil 12 is moved past only one of the two adjacent runs of that same conductor. Another minimum repeat increment criterion relates to fine position determination. For example, where mathematical interpolation is used as described below, the repeat increment should be large enough to provide good linearity of signal level vs. distance between any two adjacent runs of the conductor. Maintaining such linearity enables the fine position to be determined directly from a mathematical operation performed directly on current magnitudes, as opposed to first performing a mathematical operation on current values (e.g., forming a ratio) and then using the result of the mathematical operation with a look-up table to obtain the interpolated fine position.

A worse case estimate of error relative to $|I_{min}|$ used for interpolation is $|I(max\ incr) - I(min\ incr)|$. Therefore, conflicting goals are presented, i.e., set the minimum repeat increment as large as possible, and as close as possible to the maximum repeat increment (i.e., minimize the change in repeat increment between consecutive runs of the same conductor) to minimize fine position determination errors; and set the maximum repeat increment as small as possible for noise immunity.

If the amplitude of the induced current is to be used for interpolation, then it is preferable that the current amplitude used by that of the current induced in the conductor run closest to the center of the coil, and with negligible or no contribution from the adjacent run of the same conductor. The reason for this is that the slope of current amplitude vs. distance from coil center is apporximately linear in the region closest to the concerned conductor run.

Figure 5:
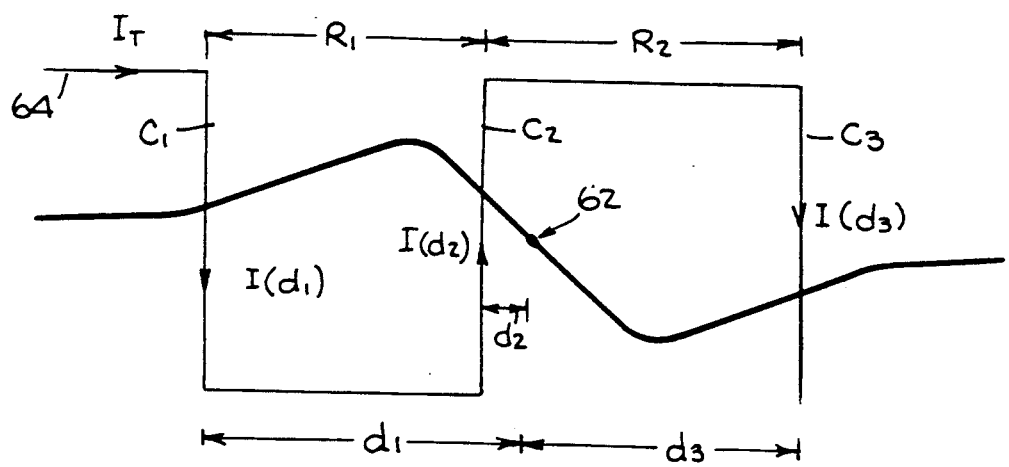
FIG. 5 is a schematic diagram showing current induced in a serpentine conductor as a function of the distance of the conductor runs from the center of a coil which interacts with the conductor, which is referred to in connection with a description of how the minimum repeat increment is determined for a serpentine conductor according to the invention.

Referring to FIG. 5, serpentine conductor 64 includes runs C1, C2, and C3 which are at distances $d_1$, $d_2$, and $d_3$, respectively, from the center 52 of coil 12; and the center 62 of coil 12 is located closest to conductor run C1. The total current amplitude $I_T$ in conductor 64 used for interpolatin, which is apprzximately equal to the sum of the currents induced in the individual runs ($I_T = I(d_1) + I(d_2) + I(d_3)$), must be approximately equal to $I(d_2)$ for good linearity. If the minimum current which will be used for interpolation is $I_{min}$, then the current amplitude contribution $I(d_2)$ of conductor run C2 is selected to be at least $0.9(I_{min})$. In other words, the maximum $I(d_1)$ and $I(d_3)$ contributions of conductor runs C1 and C3 are selected to be less than $0.1(I_{min})$. This imposes a constraint on the closeness of conductor run C2 to conductor runs C1 and C3, i.e., the minimum repeat increment. The larger the minimum repeat increment, the more accurate the interpolation may be.

In most areas of a serpentine grid tablet, the total amplitude of the induced current $I_T$ is the individual contributions of multiple conductor runs, e.g., the contributinos of $I(d_1)$, $I(d_2)$ and $I(d_3)$ (FIG. 5) in conductor runs C1, C2 and C3, as described above. Referring to FIG. 5, the current introduced by the $I(d_2)$ contribution is of the opposite polarity to the current introduced by the $I(d_3)$ contribution. If conductor runs C1 and C3 are equidistant from coil center 62, i.e., $d1 = d2$, then the currents in conductor runs C1 and C3 are equal and opposite, and cancel. In such a cse, the total current in conductor 64 will be $I(d_2)$, which introduces no interpolation error. Thus, interpolation may be facilitated and interpolatio naccuracy may be improved by spacing the conductor runs immediately adjacent each side of the run closest to the coil center equidistantly therefrom. For example, conductor run C1 and conductor run c would be spaced equally from conductor run C2, i.e. $R_1 = R_2$. However, since the conductors are fixed and the coil is movable, the conductor runs immediately adjacent the one closest to the coil center will seldom be equidistnat from the coil center. Also, it is not possible for all runs of a serpentine conductor having a nonuniform repeat increment to be equidistantly spaced from adjacent conductor runs.

However, it is possible to minimize the unequal spacing or imbalance of the two immediately adjacent conductor runs from the coil center. This is accomplished in accordance with the invention by imposing a constraint on the maximum change in repeat increment from run to run of the conductors. For example, limiting the maximum change in repeat increment to 2 limits the imbalance in relative positioning of conductor runs immediately adjacent the one closest to the coil center, and places the immediately adjacent conductor runs sufficiently close to equidistant from the coil center for various locations of the coil so that the current contributions in the two immediately adjacent runs substantially cancel.

However, since the repeat increments and change in repeat increments are known, and the location of adjacent runs of a conductor are known, the imbalance at all points on the grid is known and may be compensated. Preferably, such compensatin is accomplished by changing the sensed current amplitudes in accordance with the known imbalance. One way to implement the compensation is by means of a look-up table in which the coarse tablet location indexes the table, which then provides scaling factors for the current amplitudes to compensate for the imbalance.

Figure 6:
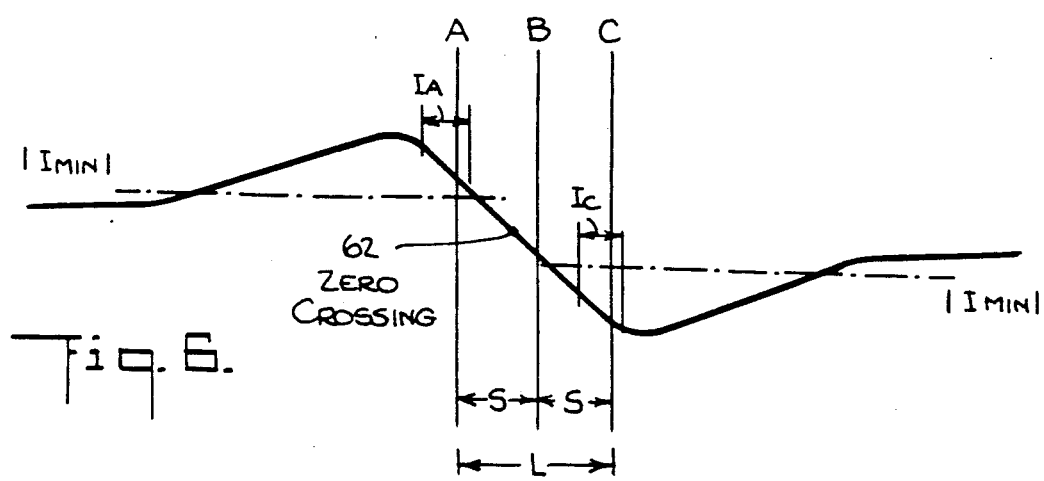
FIG. 6 is a schematic diagram showing the induced current waveform with respect to the three closest conductor runs of a serpentine conductor grid structure, which is referred to in connection with a description of interpolation of the location of the center of a coil with respect to the serpentine conductor grid structure.

Another parameter to be selected in providing a serpentine grid structure according t othe inventin is the basic conductor spacing "S", which impacts on resolution for coarse location determination and accuracy for fine location determination. In order to impose a minimum current magnitude $|I_{min}|$ criterion for the current used in interpolation, the choice of conductor runs used in interpolation must not be limited to the two between which the coil center is positioned. Referring to FIG. 6, the center of the coil is represented by zero crossing (or phase reversal point) 62, and the minimum acceptable current magnitude for interpolatio nis $|I_{min}|$ which occur on the current curve given distances in both directins from zero crossing 62. It is possible that a conductor run B be located such that it is closer to zero crossing 62 than the $|I_{min}|$ point. Therefore, the current in run B can not be used for interpolation, and interpolatin must be permitted using the currents in runs A and C, despite the location of zero crossing 62 between runs B and C.

This introduces other conflicting objectives. In order for run B to be located between runs A and C with uniform basic spacing S, the spacing L between runs A and C must be twice the basic spacing S. Since the spacing L should be much less than the coil diameter to minimize non-linearity, these criteria suggest spacing adjacent conductor runs closely. However, for a given conductor span (tablet width), closely spaced conductor runs suggest a large number of conductors, thus, presenting additional conflicting objectives.

With no minimum/maximum repeat increment criteria, N conductors can be laid out to produce $2^n - 1$ unique areas. For an overall tablet length L, the basic conductor spacing must be greater than or equal to $L/(2^n - 1)$. As constraints on repeat increment criteria are imposed, however, the number of feasible combinations of uniquely identifiable spaces may decrease from the unconstrained $2^n - 1$ combinations. In the limiting case, setting the minimum and maximum repeat increments equal to each other and equal to n*(basic conductor run spacing) constrains the number of possible unique combinations to 2n (each conductor can be run once in each direction parallel to the axis).

Typically, the standard or basic conductor spacing is constrained to be less than twice the coil diameter; and for ergonomic reasons, cursor coils are usually less than an inch in diameter. The standard conductor spacing is thus the first parameter to be set, and is in the order of approximately 0.250 inch. The maximum tablet length is selected typically be marketing criteria. With these two parameters set, the number of unique regions or spaces per axis is defined as: L/ (standard conductor spacing).

The number of unique regions required then defines the minimum number of conductors n, such that $2^n$ is greater than or equal to the number of unique regions or spaced required. The conductor spacing may be modified at this stage if, with the selected number of conductors, the desired accuracy and precision is not achieved as the tablet length increases in a particular axis.

The minimum/maximum repeat increments are selected to typically be in the order of 3 to 5 times the diameter of the coil. Since the error phenomena is expected to be a square-law function of the distance, the currents induced in adjacent conductor runs of the same conductor with these repeat increment limits is expected to be less than 0.1 of the peak value of $I_{min}$.

To reduce interpolation errors, a minimum repeat increment of about 4 * coil diameter and a maximum basic conductor spacing of about coil diameter/2 are preferred. The preferred number of conductors is obtained from the following ratio: minimum repeat increment/basic conductor spacing. Thus, the minimum number of conductors preferred is 8 (4D/(D/2)=8). These parameters (minimum repeat increment and basic conductor spacing) directly affect the achievable accuracy, and can be modified as required to achieve an economically feasible number of conductors. As digital electronic components typically come in multiples of 8 inputs/outputs, the choice is usually between 8 or 16 conductors. The preferred implementation is 8 conductors if that can provide the desired tablet length L in a given axis (L<256 * basic conductor spacing), and the coil characteristics are such that the errors induced by minimum repeat increment criteria are acceptable, provided that L/ (basic conductor spacing) combinations can be found while imposing the maximum repeat increment criterion. A 16 conductor implementation requires more components, but is typically much easier to design in view of the multitude of competing requirements. An eight conductor grid may provide up to $2^8-1$ or 255 spaces or regions, and a sixteen conductor grid may provide up to $2^{16}-1$ or 65535 spaces or regions. The actual number of unique spaces provided depends upon the constraints imposed on the conductor repeat increment.

Referring again to FIG. 3, processing circuitry (not shown in FIG. 3) provides a unique binary number identifying the position of the center 62 of coil 12 for each space 58, which identifies the two active conductor portions 53 defining the particular space 58 between which the coil center 62 lies. For example, the binary number "01000" identifies (locates coil center 62 in) space $S_{10}$ in FIG. 3; the binary number "01010" identifies space $s_{11}$; the binary number "01011" identifies space $S_{12}$; the binary number "11011" identifies space $S_{13}$; etc. The arrows in FIG. 3 associated with conductor active portions 53 correspond to current phases in the conductor active portions when the coil center 62 is located in space $S_{10}$ (coil driven system with current in coil 12 counterclockwise). The full Gray-type code for all of spaces 58 in FIG. 3 may be obtained as described above in connection with FIGS. 2A and 2B.

The tablet length in a given axis depends upon the basic spacing between adjacent conductor active portions, the number of conductors, and the repeat increments for each conductor (i.e., the number of active portions per conductor). For the X axis grid 44 depicted in FIG. 3, for a basic conductor active portion spacing of 0.250 inch, with five conductors and a repeat increment of from 4–8 (each conductor having from 5–8 active portions), which provide 30 conductors active portions and 29 spaces, a maximum tablet length of 7.25 inches is obtained, of which about six inches is the active area.

The binary numbers identifying the spaces or regions in the Y axis grid 45 may similarly be obtained. The Y axis grid 45 may be identical to that for the X axis (but rotated 90 degrees) for a square active area, or smaller or larger depending upon the particular geometry desired for the active area. As such, the Y axis grid 45 may have the same number as, or more or less than, the number of conductors in the X axis grid.

Figure 7:
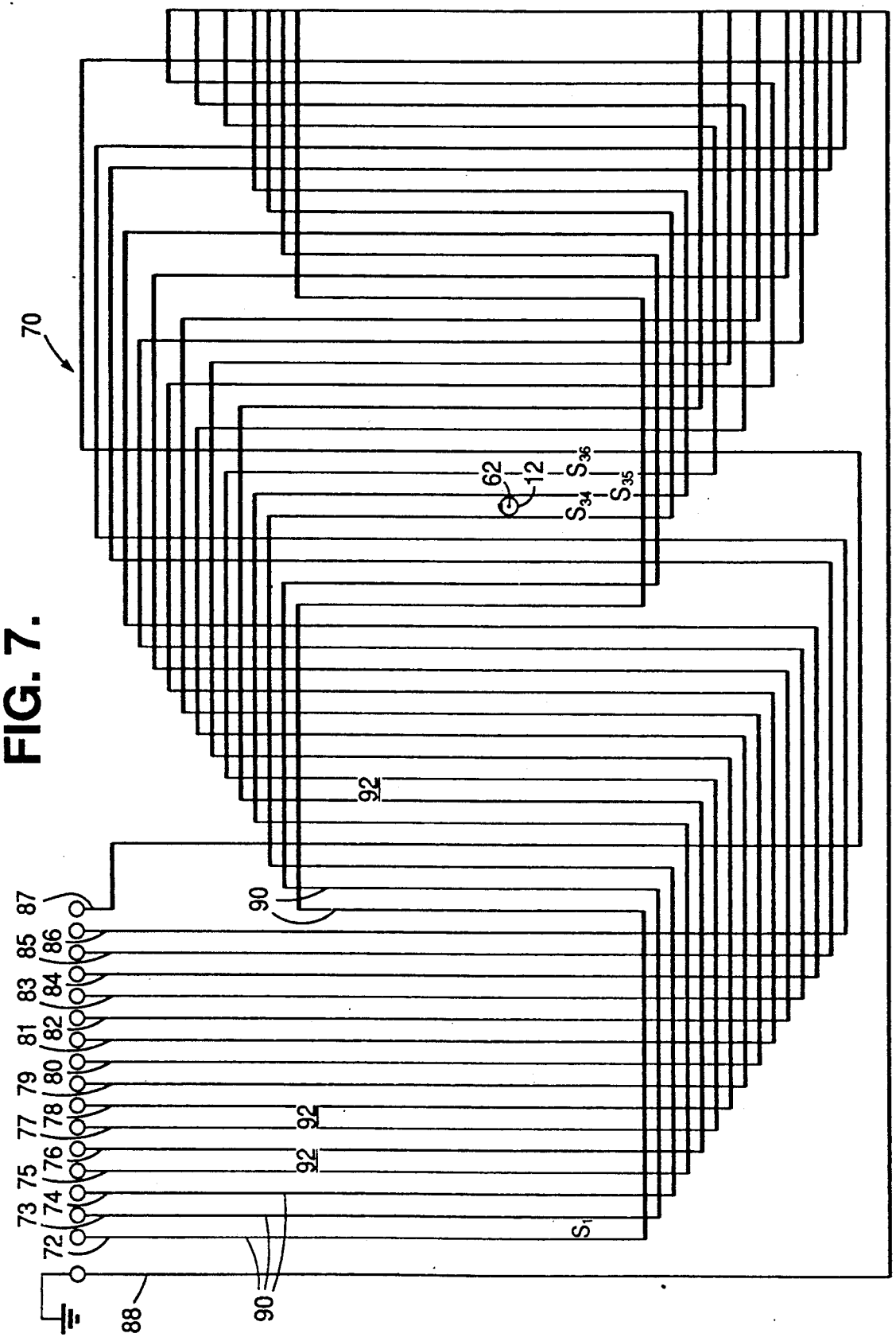
FIG. 7 is a schematic diagram of a single axis of a sixteen conductor grid structure according to the invention.

The grid for a particular axis will typically include 8 or 16 conductors, as described above, because multiplexers and other digital electronic components are typically available with 8 or 16 inputs/outputs. FIG. 7 shows an X axis grid 70 which includes sixteen conductors 72–87, each having from 3–4 active portions 90. Conductor 88 is the common return for conductors 72–87. The conductors (and the X axis and Y axis grids) are insulated from each other as described above for grid 40 of FIG. 3. In the FIG. 7 embodiment, the total number of conductor active portions 90 is fifty-five, and the total number of spaces 92 between conductor active portions 90 is fifty-four. For a basic conductor run spacing 92 of 0.250 inch, the span of X axis grid 70 is 13.5 inches, and the active area 83 is 12 inches. Conductors 72–87 are arranged in a pattern such that currents induced by a coil 12 centered in the different spaces 92 provide a Gray-type binary code as described above. For example, the center 62 of coil 12 is in space $S_{34}$, the binary number obtained from conductors 72–87 is "0001111111111110"; space $S_{35}$ provides "0000111111111110"; and space $S_{36}$ provides "0000011111111110".

The repeat increment for conductors 72–87 of X axis grid 70 varies from a repeat increment of fourteen to a repeat increment of eighteen, which for a basic spacing 92 of 0.250 inch, is from 3.5 inches to 4.0 inches. To minimize non-linearity in connection with mathematical interpolation, conductor run imbalance is held to a minimum, i.e., the maximum change in the repeat increment between consecutive runs of the same conductor is limited to 2. Table III below lists the repeat increments for each of conductors 72–87.

TABLE III

| Conductor | Increment Spacing |
|---|---|
| 72 | 15, 14, 14 |
| 73 | 15, 14, 15 |
| 74 | 15, 16, 14 |
| 75 | 16, 15, 14 |
| 76 | 16, 18 |
| 77 | 16, 14, 16 |
| 78 | 16, 18 |
| 79 | 16, 14, 15 |
| 80 | 16, 18 |
| 81 | 16, 14, 14 |
| 82 | 16, 18 |
| 83 | 16, 14 |
| 84 | 16, 18 |
| 85 | 18, 18 |
| 86 | 18, 18 |
| 87 | 18, 18 |

Figure 8:
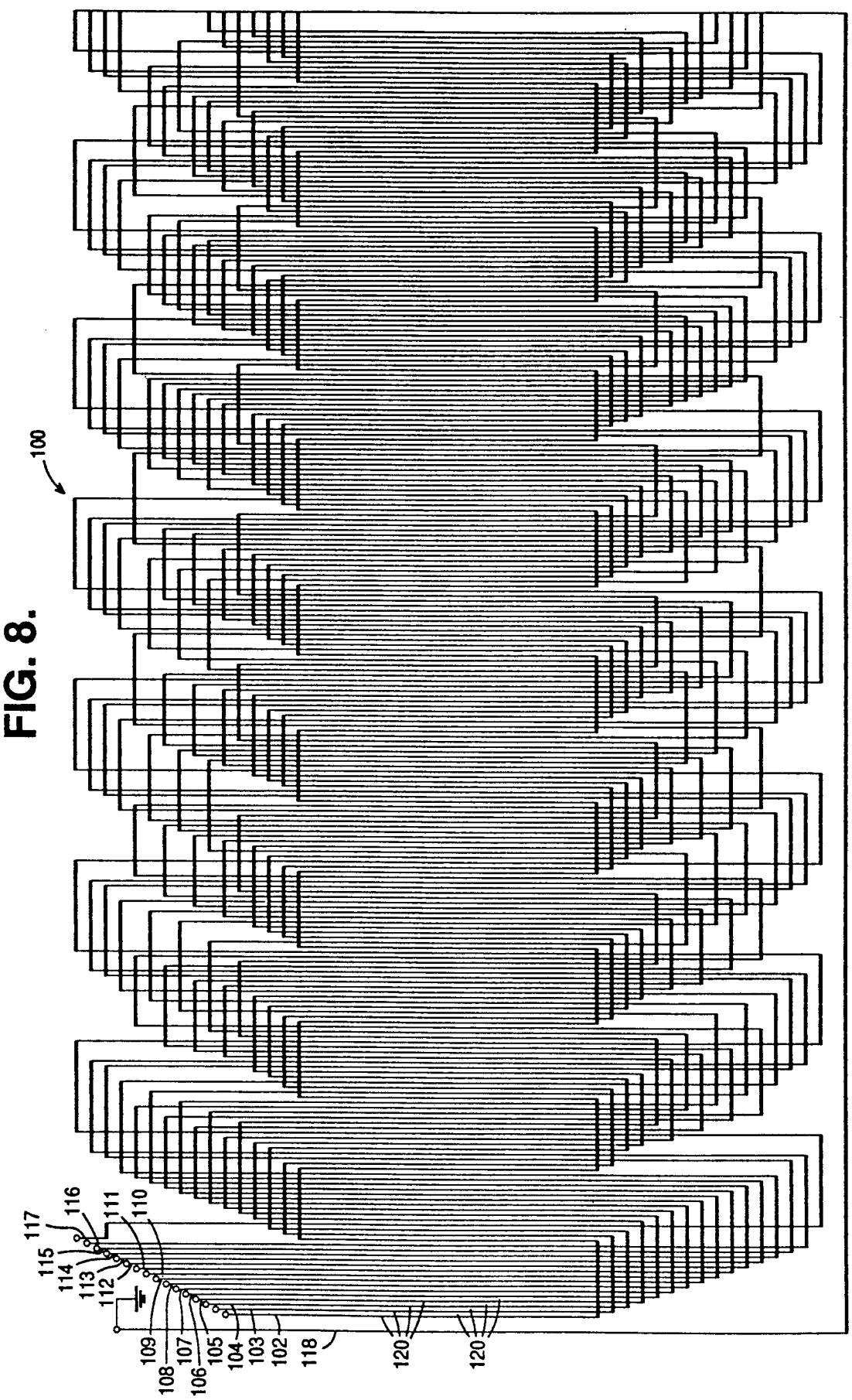
FIG. 8 is a schematic diagram of a single axis of another sixteen conductor grid structure according to the invention.
Figure 9A:
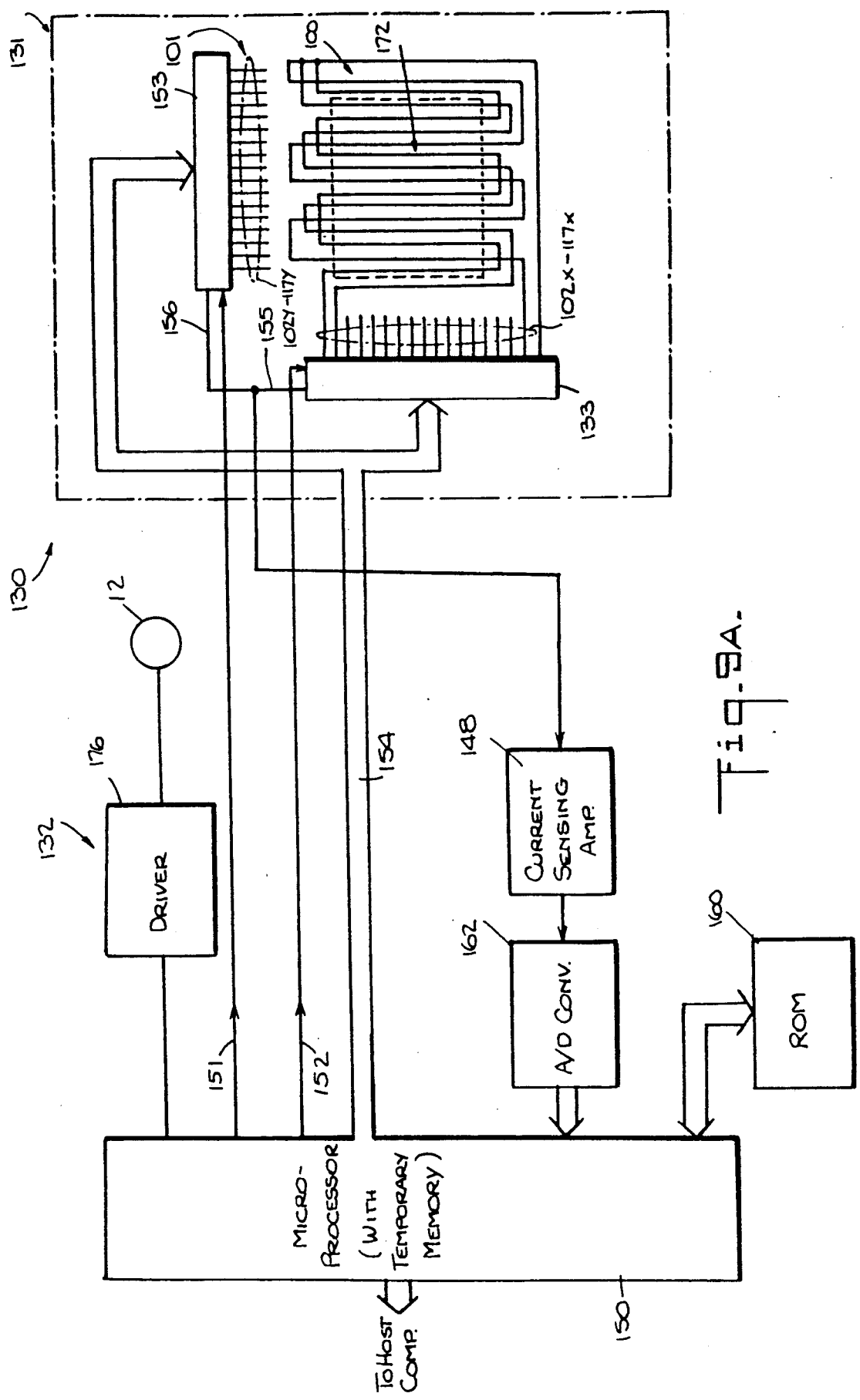
FIG. 9A is a functional block diagram of signal processing circuitry for a transducer driven digitizer system which incorporates for both axes the grid structure depicted in FIG. 8.
Figure 9B:
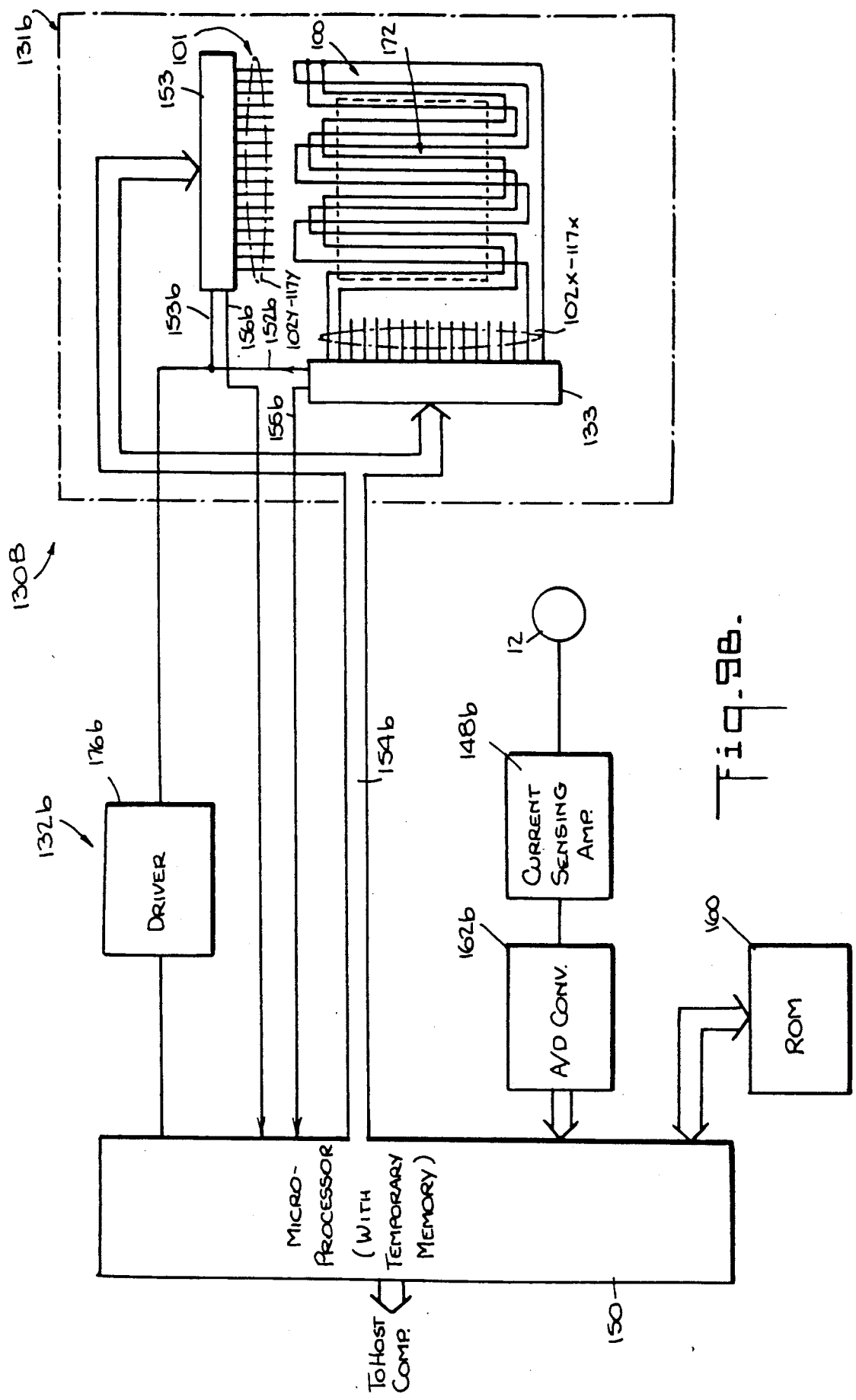
FIG. 9B is a functional block diagram of signal processing circuitry for a grid driven digitizer system which incorporates for both axes the grid structure depicted in FIG. 8.

FIG. 8 shows an X axis grid 100 which includes sixteen conductors 102–117 eahc having from 15–18 active portions. Conductor 118 is the common return for conductors 102-117. The conductors (and the X axis and Y axis grids) are insulated from each other as described above for grid 40 of FIG. 3. In the FIG. 8 embodiment, the total number of conductor active portions 120 is 256, and the total number of spaces 122 between conductor active portions is 255. For a basis spacing 122 of 0.200 inch, the length or span of X axis grid 100 is 51 inches, and the active area is 48 inches. Conductors 102-117 are arranged in a pattern such that currents induced by a coil cneterdd in the different spaces 122 provide a Gray-type binary code as described above.

The repeat increment for conductors 102-117 of X axis grid 100 varies from a repeat increment of fourteen to a repeat increment of eighteen, which for a basic spacing 122 of 0.200 inch, is from 2.8 inches to 3.6 inches. The maximum change in the repeat increment between consecutive runs of the same conductor is limited to 2 (conductor run imbalance is held to a minimum), as in the embodiments of FIGS. 3 and 7, to minimize nonlinearity in connectin with mathematical interpolation. Table IV below lists the repeat increments for each of conductors 102-117.

TABLE IV

| Conductor | Increment Spacing |
|---|---|
| 102 | 15, 14, 14, 15, 15, 15, 14, 14, 15, 14, 15, 14, 14, 14, 15, 15, 14 |
| 103 | 15, 14, 15, 14, 16, 14, 16, 14, 14, 14, 14, 16, 14, 16, 15, 15, 14 |
| 104 | 15, 16, 14, 14, 15, 15, 15, 14, 14, 15, 14, 15, 14, 14, 14, 15, 15 |
| 105 | 16, 15, 14, 15, 14, 16, 14, 16, 14, 14, 14, 16, 14, 16, 15, 15 |
| 106 | 16, 18, 17, 15, 14, 15, 15, 15, 14, 16, 14, 16, 15, 17, 18 |
| 107 | 16, 14, 16, 14, 14, 15, 15, 15, 14, 14, 15, 14, 15, 14, 14, 15 |
| 108 | 16, 18, 18, 18, 18, 18, 18, 18, 18, 17, 15, 14, 14 |
| 109 | 16, 14, 15, 15, 14, 15, 14, 16, 14, 16, 14, 14, 14, 14, 16, 14, 16 |
| 110 | 16, 18, 18, 18, 18, 16, 18, 18, 18, 18, 16, 18, 18, 18 |
| 111 | 16, 14, 14, 16, 14, 14, 16, 14, 15, 14, 14, 15, 16, 14, 16, 14 |
| 112 | 16, 18, 18, 18, 18, 17, 17, 18, 18, 18, 17, 16, 14, 16 |
| 113 | 16, 14, 16, 14, 16, 14, 16, 18, 18, 18, 16, 18, 18, 18 |
| 114 | 16, 18, 18, 18, 18, 18, 18, 18, 18, 18, 18, 18 |
| 115 | 18, 18, 18, 18, 18, 18, 18, 18, 18, 18, 18, 18, 18 |
| 116 | 18, 18, 18, 18, 18, 18, 18, 18, 18, 18, 18, 18 |
| 117 | 18, 18, 18, 18, 18, 18, 18, 18, 18, 18, 18, 18, |

For the FIG. 8 embodiment described in the preceding paragraph, the minimum spacing between adjacent conductor active portions of the same conductor is 2.8 inches, or a repeat increment of 14.

Figure 10:
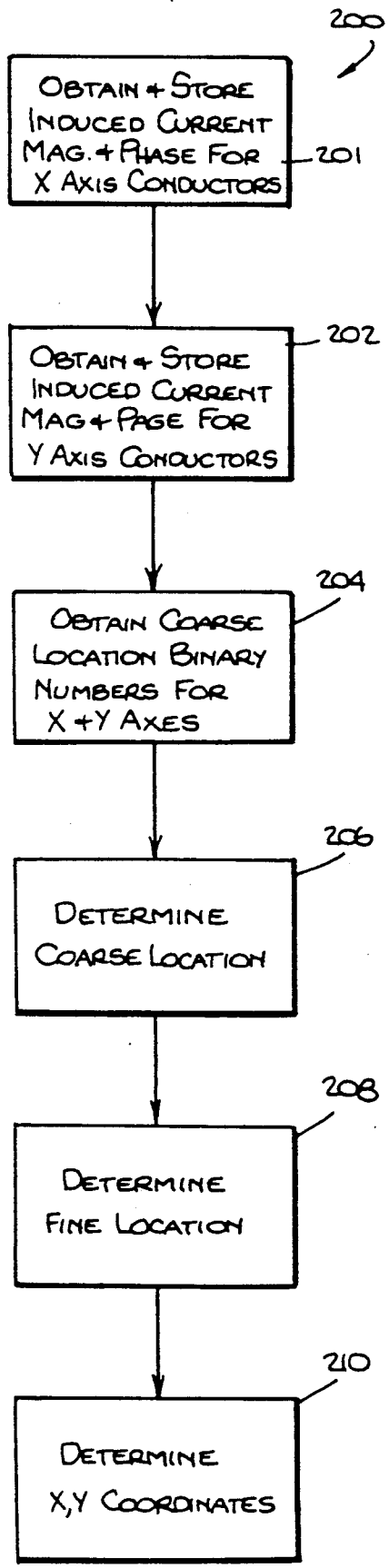
FIG. 10 is a flow chart illustrating operation of the grid structure and signal processing circuitry of FIG. 9A.
Figure 11:
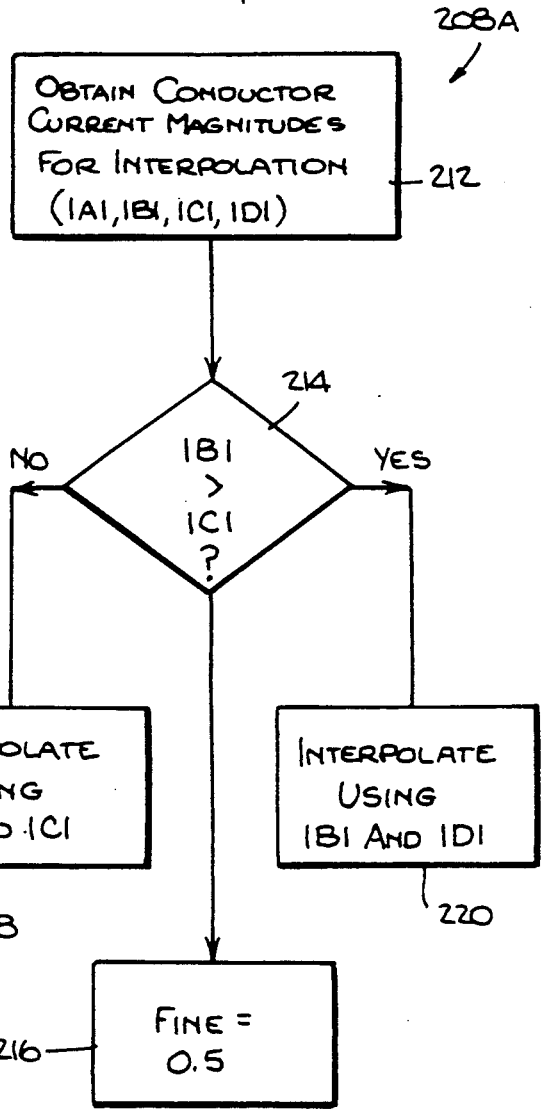
FIG. 11 is flow chart illustrating a fine position interpolation routine in the flow chart of FIG. 10.

Signal acquisition and processing to obtain the signals representing the coordinates of the movable element relative to the digitizer active area are described below in connection with FIGS. 9-11. Referring first to FIG. 9A, coil driven digitizer system 130 according to the invention comprises digitizer tablet 131 which includes X and Y axes grids 100 and 101 similar to X axis grid 100 of FIG. 8, and signal acquisition and processing circuitry 132. One end of each of X axis grid conductors 102x-117x is coupled to an X axis multiplexer 133, and one end of each of Y axis grid conductors 102y-117y is coupled to a Y axis multiplexer 153. Multiplexers 133, 153 may be conventional 16-to-1 multiplexers (or two, 8-to-1 multiplexers). Respective opposite ends of X axis grid conductors 102x-117x are connected to ground, and respective opposite ends of Y axis grid conductors 102y-117y are connected to ground. Output 155 of multiplexer 13 and output 156 of multiplexer 153 are coupled to current sensing amplifier 148. Microprocessor 160 via X/Y select lines 151, 152 enables one of multiplexers 133, 153 at a time, and via address bus 154 selects one grid line at a time to be coupled from an input of the enabled multiplexer 133, 153 to the output 155, 156 of the enabled multiplexer 133, 153.

Microprocessor 150 is coupled to read only memory (ROM) 160 (e.g., EPROM) containing the program for operating digitizer system 130, a look-up table for correlating binary numbers corresponding to the current phases in the individual conductors of grids 100, 101 to a coarse tablet location, and a look-up table for scaling current amplitudes used for interpolation, as described above. Microprocessor 150 also includes temporary read/write memory for storing the digital signals corresponding to the induced currents detected in the individual grid conductors. Such temporary memory may simply be registers or random access memory (RAM).

Current sensing amplifier 148 is coupled to an analog-to-digital (A/D) converter 162 which is in turn coupled to microprocessor 150. Current sensing amplifier 148 may include circuitry for introducing a dc offset to the currents sensed from X/Y multiplexers 133, 153, as described below.

As mentioned above, digitizer system 130 is coil driven, i.e., coil 12 is energized and the signals induced in grid conductors 102x-117x and 102y-117y are sampled and processed to obtain the coordinates of coil 12 relative to the active area 172 of tablet 131. Coil 12 is tuned to the frequency of interest and induces a current in each of grid conductors 102x-117x and 102y-117y depending on the position of coil 12. Microprocessor 150 outputs clock pulses at a given frequency, e.g., 10KHz. to 20 KHz., to driver 176, which provides sufficient current to coil 12. Microprocessor 150 is programmed in known manner to associate currents sampled on the grid conductors with phasing of the signals supplied to coil 12.

Processing circuitry 132 is shown functionally in FIG. 9A, and may be implemented by discrete components, or by a microcontroller or microcomputer including all or some of the functional blocks depicted. For example, an 8096-family microcontroller, available from Intel Corp., with associated support circuitry may implement microprocessor 150, A/D converter 162, ROM 160 and driver 176, depending upon the particular microcontroller selected. If sufficient input/output pins are available, microprocessor 150 may also implement multiplexers 133, 153. Current sensing amplifier 148 may be implemented by conventional operational amplifier circuitry. If not implemented by microprocessor 150, ROM 160 may be implemented by conventional EPROM chips, etc. Strobe signal lines, a clock and other conventional components or parts of processing circuitry 132 have not been shown and are known to those of skill in the art.

Referring next to the flow chart in FIG. 10, digitizer system 130 is operated according to a main routine 200 as follows. The magnitudes and phases of the current signals induced in each of the sixteen conductors of the X axis grid conductors 102x-117x and the Y axis grid conductors 102y-117y for the position of coil 12 on active area 172 are obtained and temporarily stored in internal registers of microprocessor 150 according to routines 201 and 202. For the cursor-driven system 130 of FIG. 9A, each grid conductor 102x–117x and 102y–117y is sequentially coupled to current sensing amplifier 148, which interjects a dc offset to the sensed current signals and amplifies the sensed current signals, providing voltage output signals proportional to the amplified current signals. For example, the voltage output signals may have a dc offset of 2.0 volts, so that voltages between 0 and 2.0 are 180 degrees out of phase with voltages above 2.0 volts. These voltage signals are supplied to A/D converter 162 which converts the positive analog voltages to digital signals and supplies them to microprocessor 150 which causes the digital representations of the analog voltages to be stored in internal registers. Microprocessor 150 is programed to recognize stored voltages below 2.0 volts as corresponding to grid currents of one phase, and to recognize stored voltages above 2.0 volts as corresponding to currents of the opposite phase.

The binary number described above which represents the coarse location of the center of coil 12 within a particular space or regions between two immediately adjacent conductor active portions for the X axis and for the Y axis is then determined by microprocessor 150 according to routine 204. Microprocessor 150 accomplishes that by ordering the phases of the stored voltage signals in accordance with the multiplexing sequence of the grid conductors for each axis.

The binary numbers obtained in routine 204 are indexed by microprocessor 150 according to routine 206 in a look-up table contained in ROM 160, which supplies the coordinates of the coarse location, i.e., the particular region between conductor active portions for each axis in which the center of coil 12 lies. If mathematical interpolation is used to determine fine location, the indexed location of the ROM look-up table also identifies the conductors which are to be used in the fine location determination for each axis.

However, fine location may be determined largely independently of the coarse position determination, i.e., a number of techniques may be used for fine position determination, and microprocessor 150 determines fine position according to routine 208. It is preferred that fine location of coil 12 for each axis be determined by mathematical interpolation according to, for example, routine 208A flow charted in FIG. 11. Alternatively, fine location may be determined as described below, or using current phases in a pair of conductors as described in the Bailey '963 Patent.

Referring again to FIG. 10, microprocessor 150 in routine 210 then determines the precise X and Y coordinates of the cursor from the coarse and fine location determinations for each axis.

Figure 12:
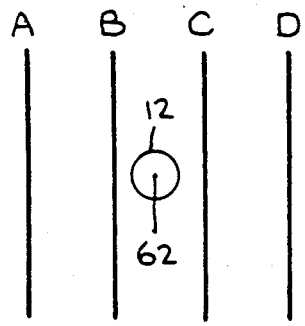
FIG. 12 is a schematic view illustrating the grid conductors selected for fine position determination in the flow chart of FIG. 11.

Fine position may be determined by interpolation as follows. Because there may be some ambiguity as to which two conductors to use for interpolation, and to implement use of a minimum current magnitude ($|I_{min}|$) for interpolation, as discussed above, step 206 of main routine 200 (FIG. 10) identifies for each axis, more than two conductors, e.g., four conductors. As shown in FIG. 12, those four conductors for each axis are designated "A", "B", "C", and "D". Referring to FIG. 11, in step 212 of routine 208A, the magnitudes (i.e., absolute values) of the currents in conductors A, B, C, D are obtained. In steps 214, the current magnitudes in conductors B and C are compared. If they are the same, then the fine position is midway between conductors B and C (step 216). If the current magnitude is greater in conductor C, then the current magnitudes in conductors A and C are used for interpolation (step 218). If the current magnitude is greater in conductor B, then the current magnitudes in conductors B and D are used for interpolation (step 220). Actual interpolation is then mathematically performed in either step 218 or step 220 by taking the ratio of the signal magnitudes in the two conductors of interest. For example, if conductors B and D are to be used, the ratio is:

$$\frac{|B|}{|B| + |D|}$$

Figure 13:
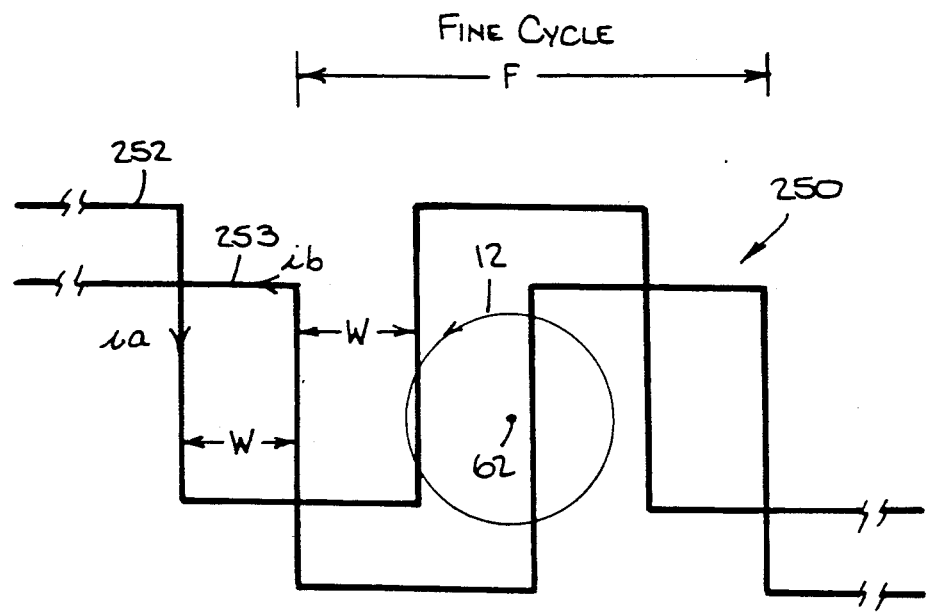
FIG. 13 is a schematic view of a two conductor serpentine fine location or secondary grid which is independent of the coarse grid.

An alternate embodiment for determining fine position is as follows. A "fine location" or "secondary" conductor structure or grid is either disposed adjacent the "primary" or "coarse location" grid (so that it is independent of the primary or coarse location grid), or a fine location grid is disposed a part of the primary grid structure. A separate, independent, secondary two-conductor serpentine grid is described below. Referring to FIG. 13, serpentine grid 250 comprises two serpentine conductors 252, 253 each having a constant repeat increment and with equal basic conductor run spacing W. Three or four conductors instead of two may be run in a similar serpentine pattern to minimize non-linearity errors as the distance from the coil center increases.

The current induced in each run of each conductors 252 and 253 is a function of the distance of the respective run from the center of a coil (not shown) inducing the current. With uniform basic conductor run spacing W, the composite current induced in each conductor is primarily a function of the distance from the coil center to the nearest conductor run. Ignoring edge effects, the current induced when the coil is centered over a conductor run will be 0; moving the coil to one side of that conductor run increases the current, and moving the coil to the other side decreases the current. The current peaks (i.e., a maximum positive peak or a maximum negative peak) when the edge of the coil is approximately tangent to the conductor run. Thus, as the coil is moved across the surface of the secondary grid 250, the induced current will be a sinusoidal-like waveform, the precise shape of which is a function of the coil diameter relative to the basic conductor run spacing.

For example, if the coil diameter is much larger than the basic conductor spacing, the induced current waveforms will be triangle-like (saw tooth) because as the coil is moved across the grid there will be times when two or more conductor runs will be within the coil diameter so the induced currents conflict with each, and other times when a conductor run is tangent to the coil edge. If the coil diameter is less than the conductor spacing W, the induced current waveform will be sinusoidal-like with flattened peaks (trapezoidal-like) corresponding to the times that the coil edges are spaced from the conductor runs, which accentuates the tangential effect.

About the induced current zero point (the center of the coil is above a conductor run), regardless of the repeat pattern, the induced current is for the most part approximately linear vs. distance from the center of the coil.

Referring to FIG. 13, it has been found that choosing a repeat increment equal to the coil diameter produces a set of induced currents such that $|ia|/(|ia|+|ib|)$ produces a quotient between 0 and 1 which is directly proportional to the distance from the "a" conductor; ia being the smaller current magnitude and ib the larger.

The advantage of using the $|ia|/(|ia|+|ib|)$ ratio is that the division makes the quotient independent of the amplitude of the induced current and the drive current need not be consistent from digitizer tablet-to-digitizer tablet, and the cursor distance above the grid need not be fixed. For improved accuracy a polynomial fit can be employed instead of the sample linear model described above, i.e.:

$$x = A_0 + A_1[|ia|/(|ia|+|ib|)] + A_2[|ia|/(|ia|+|ib|)]^2 + \ldots + A_n[|ia|/(|ia|+|ib|)]^n.$$

$A_0$ thru $A_n$ may be found by building or simulating a model of the grid and collecting the $|ia|/(|ia|+|ib|)$ quotient of various points on the grid (at known location x). Then a polynomial curve fitting program may be applied using $(|x - \text{location of "a"}|)$ as the independent variable, and $|ia|/(|ia|+|ib|)$ as the dependent variable. The number of terms on the polynomial may be determined to minimize calculations while maximizing accuracy.

With the increment repeat spacing of secondary grid 250 equal to the diameter of coil 12, fine cycle "F" (two repeat increments for a conductor 252 or 253) may be determined to be a distance corresponding to twice the coil diameter. If the maximum repeat increment for a coarse grid conductor is in the order of 4-8 coil diameters (for noise immunity) and basic spacing for the coarse grid conductor runs is equal to that for the fine grid, then 2-4 conductors are required for 4-16 possible runs ($2^n$), or an active area of 8-32 coil diameters. Reducing the basic coarse location spaces to half the fine grid cycle enables twice the number of conductors to be used, i.e., 4-8 conductors, for an active area of 32-256 coil diameters. Reducing the basic coarse grid spacing even further provide similar increases in the number of possible options and overall grid size. Table V presents these parameters for various numbers of conductors and coil diameters.

TABLE V

| Conductors (n) | Conductors Run Spacing (In Coil Diameters) | Possible Spaces ($2^n$) | Active Area (In Coil Diameters) |
|---|---|---|---|
| 4 | ½ | 16 | 4 |
| 6 | ½ | 64 | 16 |
| 8 | ½ | 256 | 64 |
| 10 | ½ | 1024 | 256 |
| 16 | ½ | 65536 | 16384 |

Figure 14:
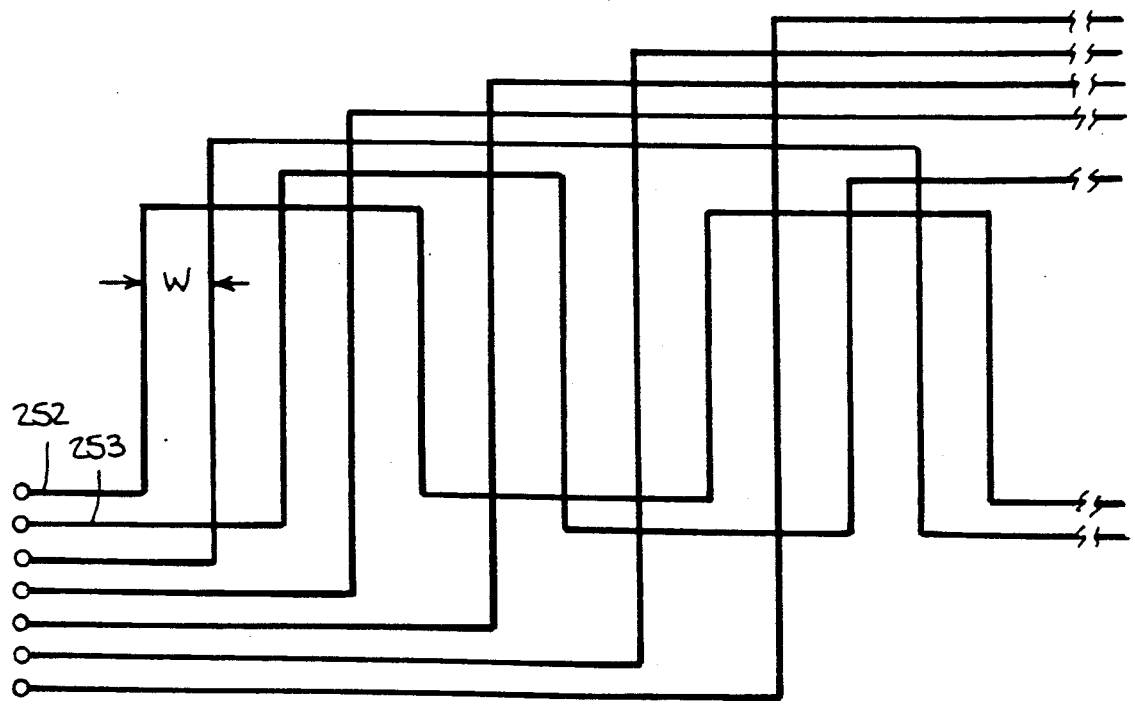
FIG. 14 is a schematic view of a two conductor serpentine, fine location or secondary grid incorporated into a coarse or primary grid.

As mentioned above, the fine location or secondary grid may form part of the coarse, primary grid. In that case, two conductors are constrained to have constant spacing, as shown in FIG. 14 and Table V.

Either approach, however, requires that the fine grid repeat increment be twice the diameter of the coil for optimal accuracy. A smaller repeat increment will be less efficient and potentially less accurate due to conflicting current inductions. A large fine cycle width will be less sensitive to repeat patterns but would not be accurate as both conductors could be "far away" (into the non-linear region) from the coil center.

Still another approach uses two grid wires and current phasing as described in the Bailey '963 Patent.

As indicated above, the particular grid conductor patterns which satisfy the minimum and maximum repeat increments, and which are capable of identifying the spaces between conductor active portions in a Gray-type binary code may be determined manually or with computer assistance. FIG. 15 is a flow chart of an algorithm for laying out a grid conductor pattern for an axis of the grid. The following parameters are input as givens: number of grid line locations (or conductor runs or active portions), referred to as "goal grid #," which are sequentially numbered so that conductor active portion #1 corresponds to the first grid line location, conductor active portion #2 corresponds to the second grid line location, etc.; number of grid conductors, referred to as "max wire #"; minimum repeat increment, "$R_{min}$"; and maximum repeat increment, "$R_{max}$."

The "generate pattern" algorithm 300 flow charted in FIG. 15 then determines and prints a grid pattern which satisfies the above. Step 302 sets the grid line location to #1, i.e., sets the location of the first conductor active portion to the first grid line location. Step 304 determines whether the highest grid line location designated is greater than or equal to the goal grid line location (goal grid #). If it is, the algorithm considers that a pattern has been determined which satisfies the goals and repeat maximum and minimum increments, and in step 306 prints the pattern and in step 308 stops. If the highest grid line location designated is not greater than or equal to the goal grid #, then the algorithm proceeds to step 310 in which the conductor number is set to #1. If in step 312 the number of grid conductors does not exceed the maximum number of conductors (max wire #), then the algorithm proceeds to step 314, which determines the bit pattern (binary number) of the overall pattern generated to this point including the conductor active portion placed at the last grid line location considered.

Step 316 determines if that binary number is unique, i.e., whether that binary number was generated already for a previous stage of the pattern. If it is unique, then in step 318 the distance between this last placed conductor active portion and the adjacent one for the same conductor, i.e., the last repeat increment for that conductor is determined. If that repeat increment is within the minimum and maximum repeat increments, as determined in step 320, then in step 322, that conductor is selected for that grid line location, and the information is stored. The grid line location is then incremented in step 324 and the algorithm proceeds to step 304 to determine the conductor to be placed in the next grid line location (steps 310-324) or the grid pattern is printed and the algorithm stopped (steps 306-308).

If in step 312 the conductor number exceeds the max wire #, then the algorithm proceeds to step 326 in which the grid line location number is decremented. If the decremented grid line number in step 326 is zero, then a desired grid pattern is not possible within the goal parameters. In step 328, the conductor number is reset back to the one selected for the decremented grid line location. Step 330 then increments the conductor number and the algorithm proceeds to step 312. The loop formed by steps 326, 328 and 330 is cycled, and the grid line location decremented until the conductor number is less than the max wire #, as determined in step 312. This loop enables the algorithm to back track to a particular point and then process forward with a different pattern until a desired grid pattern is determined. Thus, the algorithm does not have to look forward but is allowed to proceed until it determines that the pattern generated to that point does not satisfy the goals, at which point, the algorithm back tracks.

If in step 320, the minimum and maximum repeat increments are not satisfied, the conductor number is incremented and the next conductor tried starting with step 312.

The algorithm flow charted in FIG. 15 will provide one grid pattern satisfying the goal parameters. There may be others, which may be determined with the aid of already-generated grid patterns, or by use of other algorithms, or by modifying the FIG. 15 algorithm. For example, in addition the maximum and minimum repeat increment constraints, the constraint on the maximum change in repeat increment between consecutive runs of a conductor may be imposed to enhance the cancellation effect of induced currents for runs adjacent the one closest to the coil center, as describe above in connection with FIG. 3 and Table III. As indicated above, it will be easier to generate desired grid patterns when a number of conductors exceeding the absolute minimum required is utilized.

FIG. 9B shows a digitizer system 130B which is grid driven, i.e., conductors 102x–117x and 102y–117y are sequentially energized and the currents induced in coil 12 are sampled. Multiplexers 133 and 153 sequentially switch one end of each of the grid conductors to ground while an energizing signal is applied from driver 176b to the other ends which are connected together and to driver 176b. Current sensing amplifier 148b, which is coupled to coil 12, senses and amplifies signals induced in coil 12 generally as described above for signals induced in the grid conductors of system 130. A/D converter 162B converts the analog signals to digital signals which are supplied to microprocessor 150. Signal acquisition and processing is generally as described above for coil driven system 130 of FIG. 9A, with changes that are apparent due to the dual nature of coil and grid driven systems. As discussed above for FIG. 9A, FIG. 9B is a functional block diagram, and may be implemented, except perhaps for current sensing amplifying 148b, by a microcontroller (e.g. Intel 8096 family) or a microcomputer.

As is the case with most digitizer grid structures, "edge effect" errors may be present in areas close to the conductor connecting portions and the ground and returns of the conductors. Such errors may be avoided or minimized by defining an active area suitably spaced from such connecting portions, returns and ground. Alternatively, such "edge effects" may be compensated.

Certain changes and modifications of the embodiments of the invention herein disclosed will be readily apparent to those of skill in the art. Moreover, uses of the invention other than for coordinated determination in a digitizer system will also be readily apparent to those of skill in the art. It is the applicant's intention to cover by the claims all such uses and all those changes and modifications which could be made to the embodiments of the invention herein chosen for the purposes of disclosure which do not depart from the spirit and scope of the invention.

What is claimed is:

1. A conductor structure for a position-determining device which includes a movable element and determines the location of said movable element relative to said conductor structure;

said conductor structure comprising;

at least first, second and third conductors each of which includes at least three active portions extending substantially in a first direction substantially in or adjacent a common plane substantially parallel to each other, said conductors each having repeat increments which space adjacent active portions of the same conductor; and means for coupling the spaced active portions of same conductors in series;

said conductors being arranged in a pattern such that:

(a) each of said active portions of all of said conductors or spaces therebetween may be uniquely identified by a unique binary number, respective binary digits of each of said unique binary numbers corresponding to respective conductors, whereby upon interaction between said movable element and respective conductors binary logic signals may be obtained corresponding to said binary digits which are indicative of the location of said movable element relative to said conductor structure; and (b) the repeat increment of at least one of said conductors is non-uniform.

2. A conductor structure for a position-determining device which includes a movable element and determines the location of said movable element relative to said conductor structure;

said conductor structure comprising;

at least first, second and third conductors each of which includes at least three active portions extending substantially in a first direction substantially in or adjacent a common plane substantially parallel to each other, said conductors each having repeat increments which space adjacent active portions of the same conductor; and means for coupling the spaced active portions of same conductors in series;

said conductors being arranged in a pattern such that:

(a) each of said active portions of all of said conductors or spaces therebetween may be uniquely identified by a unique binary number, respective binary digits of each of said unique binary numbers corresponding to respective conductors, whereby upon interaction between said movable element and respective conductors binary logic signals may be obtained corresponding to said binary digits which are indicative of the location of said movable element relative to said conductor structure; and (b) the repeat increment of at least one of said conductors is non-uniform in a position determining area of said conductor structure.

3. A conductor structure for a position-determining device which includes a movable element and determines the location of said movable element relative to said conductor structure;

said conductor structure comprising;

at least first, second and third conductors each of which includes a plurality of active portions extending substantially in a first direction substantially in or adjacent a common plane substantially parallel to each other, said conductors each having repeat increments which space adjacent active portions of the same conductor; and means for coupling the spaced active portions of same conductors in series;

said conductors being arranged in a pattern such that:

(a) each of said active portions of all of said conductors or spaces therebetween may be uniquely identified by a unique binary number, respective binary digits of each of said unique binary numbers corresponding to respective conductors, whereby upon interaction between said movable element and respective conductors binary logic signals may be obtained corresponding to said binary digits which are indicative of the location of said movable element relative to said conductor structure;

(b) the repeat increment of at least one of said conductors is non-uniform; and (c) the repeat increment of said conductors is constrained by a maximum repeat increment that is determined in relation to desired noise immunity.

4. A conductor structure for a position-determining device which includes a movable element and determines the location of said movable element relative to said conductor structure;

said conductor structure comprising;

at least first, second and third conductors each of which includes a plurality of active portions extending substantially in a first direction substantially in or adjacent a common plane substantially parallel to each other, said conductors each having repeat increments which space adjacent active portions of the same conductor; and means for coupling the spaced active portions of same conductors in series;

said conductors being arranged in a pattern such that:

(a) each of said active portions of all of said conductors or spaces therebetween may be uniquely identified by a unique binary number, respective binary digits of each of said unique binary numbers corresponding to respective conductors, whereby upon interaction between said movable element and respective conductors binary logic signals may be obtained corresponding to said binary digits which are indicative of the location of said movable element relative to said conductor structure; and (b) the repeat increment of at least one of said conductors is non-uniform; and (c) the repeat increment of said conductors is constrained by a maximum repeat increment that is determined in relation to desired noise immunity, or a minimum repeat increment or a maximum change in repeat increments between consecutive runs of a same conductor, or combinations of a maximum repeat increment, a minimum repeat increment and a maximum change in consecutive repeat increments.

5. The conductor structure of claim 4 wherein the repeat increment is constrained by a minimum value and by a maximum value.

6. The conductor structure of claim 4 wherein the repeat increment is constrained by a minimum value, by a maximum value and by maximum change in consecutive repeat increments.

7. Apparatus for determining the location of a movable element relative to a given area comprising:

a conductor structure which interacts with said element when said element is on or adjacent said given area and upon energization of at least one of said conductor structure and said element;

said conductor structure comprising:

at least first, second and third conductors each of which includes a plurality of active portions extending substantially in a first direction substantially in or adjacent a common plane substantially parallel to each other, said conductors each having repeat increments which space adjacent active portions of the same conductor; and means for coupling the spaced active portions of same conductors in series;

said conductors being arranged in a pattern such that:

(a) each of said active portions of all of said conductors or spaces therebetween may be uniquely identified by a unique binary number, respective binary digits of each of said unique binary numbers corresponding to respective conductors, whereby upon interaction between said movable element and respective conductors binary logic signals may be obtained corresponding to said binary digits which are indicative of the location of said movable element relative to said conductor structure; and (b) the repeat increment of at least one of said conductors is non-uniform and the repeat increment of said at least one conductor is constrained by a maximum repeat increment, or a minimum repeat increment or a maximum change in repeat increments between consecutive runs of a same conductor, or combinations of a maximum repeat increment, a minimum repeat increment and a maximum change in consecutive repeat increments.

said apparatus including:

means for energizing one of said conductor structure and said movable element to cause location-determining signals to be present in the other;

means for processing said location-determining signals in the other of said conductor structure and said movable element, said processing means including first means for obtaining from said location-determining signals binary signals corresponding to said binary digits which identify said conductor runs and are indicative of the location of said movable element relative to said given area.

8. The apparatus of claim 7 wherein the repeat increment is constrained by a minimum value and by a maximum value.

9. The apparatus of claim 7 wherein the repeat increment is constrained by a minimum value, by a maximum value and by maximum change in consecutive repeat increments.

10. A conductor system for a position-determining device which includes a movable element and determines the location of said movable element relative to said conductor system;

said conductor system comprising first and second conductor structures;

said first conductor structure comprising:

at least first, second and third conductors each of which includes a plurality of active portions extending substantially in a first direction substantially in or adjacent a common plane substantially parallel to each other, said conductors each having repeat increments which space adjacent active portions of the same conductor; and means for coupling the spaced active portions of same conductors in series;

said second conductor structure comprising:

at least fourth, fifth and sixth conductors each of which includes a plurality of active portions extending substantially in a first direction substantially in or adjacent a common plane substantially parallel to each other, said fourth, fifth and sixth conductors each having repeat increments which space adjacent active portions of the same conductor; and means for coupling the spaced active portions of same fourth, fifth and sixth conductors in series;

said conductors of said first conductor structure and said conductors of said second conductor structure being arranged in respective patterns such that for each pattern:

(a) each of said active portions of all of said conductors or spaces therebetween of each conductor structure may be uniquely identified by a unique binary number with respect to that conductor structure, respective binary digits of each of said unique binary numbers corresponding to respective conductors, whereby upon interaction between said movable element and respective conductors binary logic signals may be obtained corresponding to said binary digits which are indicative of the location of said movable element relative to said conductor structure; and (b) the repeat increment of at least one of said conductors is non-uniform and the repeat increment of said at least one conductor is constrained by a maximum repeat increment, or a minimum repeat increment or a maximum change in repeat increments between consecutive runs of a same conductor, or combinations of a maximum repeat increment, a minimum repeat increment and a maximum change in consecutive repeat increments.

11. The conductor system of claim 10 wherein the repeat increment is constrained by a minimum value and by a maximum value.

12. The conductor system of claim 10 wherein the repeat increment is constrained by a minimum value, by a maximum value and by maximum change in consecutive repeat increments.

13. Apparatus for determining the location of a movable element relative to a given area comprising:

a conductor system which interacts with said movable element when said movable element is on or adjacent said given area and upon energization of at least one of said conductor system and said movable element;

said conductor system comprising first and second conductor structures;

said first conductor structure comprising:

at least first, second and third conductors each of which includes a plurality of active portions extending substantially in a first direction substantially in or adjacent a common plane substantially parallel to each other, said conductors each having repeat increments which space adjacent active portions of the same conductor; and means for coupling the spaced active portions of same conductors in series;

said second conductor structure comprising:

at least fourth, fifth and sixth conductors each of which includes a plurality of active portions extending substantially in a first direction substantially in or adjacent a common plane substantially parallel to each other, said fourth, fifth and sixth conductors each having repeat increments which space adjacent active portions of the same conductor; and means for coupling the spaced active portions of same fourth, fifth and sixth conductors in series;

said conductors of said first conductor structure and said conductors of said second conductor structure being arranged in respective patterns such that for each pattern:

(a) each of said active portions or spaces therebetween of all of said conductors of each conductor structure may be uniquely identified by a unique binary number with respect to that conductor structure, respective binary digits of each of said unique binary numbers corresponding to respective conductors, whereby upon interaction between said movable element and respective conductors binary logic signals may be obtained corresponding to said binary digits which are indicative of the location of said movable element relative to said conductor structure; and (b) the repeat increment of at least one of said conductors is non-uniform and the repeat increment of said at least one conductor is constrained by a maximum repeat increment, or a minimum repeat increment or a maximum change in repeat increments between consecutive runs of a same conductor, or combinations of a maximum repeat increment, a minimum repeat increment and a maximum change in consecutive repeat increments.

said apparatus including:

means for energizing one of said conductor system and said movable element to cause location-determining signals to be present in the other;

means for processing said location-determining signals in the other of said conductor system and said movable element, said processing means including first means for obtaining from said location-determining signals binary signals corresponding to said binary digits which identify said conductor active portions and are indicative of the location of said movable element relative to said given area.

14. The apparatus of claim 13 wherein the repeat increment is constrained by a minimum value and by a maximum value.

15. The apparatus of claim 13 wherein the repeat increment is constrained by a minimum value, by a maximum value and by maximum change in consecutive repeat increments.

16. A conductor structure for a position-determining device which includes a movable element and determines the location of said movable element relative to said conductor structure;

said conductor structure comprising;

at least first, second and third conductors each of which include a plurality of active portions extending substantially in a first direction substantially in or adjacent a common plane substantially parallel to each other, adjacent active portions of the same conductor being separated by first spaces and adjacent active portions of all of said conductors being separated by second spaces; and means for coupling the spaced active portions of same conductors in series;

said conductor structure having an extent in a second direction that is different from said first direction;

said conductors being arranged in a pattern such that:

(a) at least two of said first spaces between adjacent active portions of at least one of said conductors are different;

(b) the maximum first space between any two adjacent active portions of the same conductor is less than one-half of said extent of said conductor structure; and (c) each of said second spaces between adjacent active portions or said active portions of all of said conductors may be uniquely identified by a unique binary number, respective binary digits of each of said unique binary numbers corresponding to respective conductors, whereby upon interaction between said movable element and respective conductors binary logic signals may be obtained corresponding to said binary digits which are indicative of the location of said movable element relative to said conductor structure.

17. The conductor structure of claim 16 wherein each of said conductors has a first end and a second end, the first ends of said conductors being uniquely addressable and the second ends of said conductors being coupled together.

18. The conductor structure of claim 16 wherein said first and second directions are perpendicular to each other.

19. The conductor structure of claim 16 wherein two or more of said second spaces between adjacent conductor active portions of all conductors are equal.

20. The conductor structure of claim 16 wherein two adjacent active portions of the same conductor are separated by at least one active portion of another conductor.

21. Apparatus for determining the location of a movable element relative to a given area comprising:

a conductor structure which interacts with said element when said element is on or adjacent said given area and upon energization of at least one of said conductor structure and said element;

said conductor structure comprising:

at least first, second and third conductors each of which include a plurality of active portions extending substantially in a first direction substantially in or adjacent a common plane substantially parallel to each other, adjacent active portions of the same conductor being separated by first spaces and adjacent active portions of all of said conductors being separated by second spaces; and means for coupling the spaced active portions of same conductors in series;

said conductor structure having an extent in a second direction that is different from said first direction;

said conductors being arranged in a pattern such that:

(a) at least two of said first spaces between adjacent active portions of at least one of said conductors are different;

(b) the maximum first space between and two adjacent active portions of the same conductor is less than one-half of said extent of said conductor structure; and (c) each of said second spaces between adjacent active portions or said active portions of all of said conductors may be uniquely identified by a unique binary number, respective binary digits of each of said unique binary numbers corresponding to respective conductors;

said apparatus including:

means for energizing one of said conductor structure and said movable element to cause location-determining signals to be present in the other;

means for processing said location-determining signals in the other of said conductor structure and said movable element, said processing means including first means for obtaining from said location-determining signals binary signals corresponding to said binary digits which identify said second spaces and are indicative of the location of said movable element relative to said given area.

22. The apparatus of claim 21 wherein said first and second directions are perpendicular to each other.

23. The apparatus of claim 21 wherein two or more of said second spaces between adjacent conductor active portions of all conductors are equal.

24. The apparatus of claim 21 wherein two adjacent active portions of the same conductor are separated by at least one active portion of another conductor.

25. The apparatus of claim 21 wherein said processing means includes means for storing sets of binary numbers corresponding to locations of said element relative to said given area, and means for comparing said stored sets of binary numbers and said binary numbers obtained from said binary signals to determine said location of said element relative to said given area.

26. The apparatus according to claim 22 wherein said first means of said processing means determines a coarse location of said movable element from said binary numbers relative to said given area, said coarse location corresponding to a location of said movable element between two conductor active portions, said processing means including second means for determining a fine location of said movable element relative to said given area corresponding to a location between said two conductor active portions or on one of them.

27. The apparatus according to claim 26 wherein said processing means provides the amplitudes of said position-determining signals, and said second means performs a mathematical interpolation from selected amplitudes of selected position-determining signals.

28. The apparatus according to claim 26 wherein said conductor structure comprises two additional conductors each having a plurality of active portions extending substantially in said first direction substantially in or adjacent said common plane substantially parallel to each other, said active portions of said two additional conductors being equally spaced with respect to adjacent active portions of both of said two conductors and equally spaced with respect to active portions of the same conductor, said second means processing position-determining signals in said two additional conductors to determine said fine location.

29. A conductor system for a position-determining device which includes a movable element and determines the location of said movable element relative to said conductor system;

said conductor system comprising first and second conductor structures;

said first conductor structure comprising:

at least first, second and third conductors each of which include a plurality of active portions extending substantially in a first direction substantially in or adjacent a common plane substantially parallel to each other, adjacent active portions of the same conductor being separated by first spaces and adjacent active portions of all of said conductors being separated by second spaces; and means for coupling the spaced active portions of same conductors in series;

said first conductor structure having an extent in a second direction that is different from said first direction;

said second conductor structure comprising:

at least fourth, fifth and sixth conductors each of which include a plurality of active portions extending substantially in a first direction substantially in or adjacent a common plane substantially parallel to each other, adjacent active portions of the same conductor being separated by first spaces and adjacent active portions of all of said conductors being separated by second spaces; and means for coupling the spaced active portions of the same of said fourth, fifth and sixth conductors in series;

said second conductor structure having an extent in said first direction;

said conductors of said first conductor structure and said conductors of said second conductor structure being arranged in respective patterns such that for each pattern:

(a) at least two of said first spaces between adjacent active portions of at least one of said conductors are different;

(b) the maximum first space between any two adjacent active portions of the same conductor is less than one-half of said extent of said conductor structure; and (c) each of said second spaces between adjacent active portions or said active portions of all of said conductors may be uniquely identified by a unique binary number, respective binary digits of each of said unique binary numbers corresponding to respective conductors.

30. The conductor system of claim 29 wherein said first and second directions are perpendicular to each other.

31. The conductor system of claim 29 wherein, for each of said first and second conductor structures, said second spaces between adjacent conductor active portions of all conductors of the respective conductor structure are equal.

32. The conductor system of claim 29 wherein, for each of said first and second conductor structures, two adjacent active portions of the same conductor are separated by at least one active portion of another conductor.

33. The conductor system of claim 29 wherein said processing means includes means for storing sets of binary numbers corresponding to locations of said element relative to said conductor system, and means for comparing said stored sets of binary numbers and said binary numbers obtained from said binary signals to determine said location of said movable element relative to said conductor system.

34. The conductor system of claim 29 wherein said first means of said processing means determines a coarse location of said movable element from said binary numbers, said coarse location corresponding to a location of said movable element, with respect to each of said conductor structures, between two conductor active portions, said processing means including second means for determining a fine location of said movable element, with respect to each of said conductor structures, between said two conductor active portions or on one of them.

35. The conductor system of claim 34 wherein, for each of said conductor structures, said processing means provides the amplitudes of said position-determining signals, and said second means performs a mathematical interpolation from selected amplitudes of selected position-determining signals.

36. The conductor system of claim 34 wherein said first and second conductor structures each comprises two additional conductors which each have a plurality of active portions extending substantially in said first or second direction, respectively, substantially in or adjacent said common plane substantially parallel to each other, said active portions of said two additional conductors being equally spaced with respect to adjacent active portions of both of said two conductors and equally spaced with respect to active portions of the same conductor, said second means processing position-determining signals in said two additional conductors for each of said first and second conductor structures to determine said fine location.

37. Apparatus for determining the location of a movable element relative to a given area comprising:

a conductor system which interacts with said movable element when said movable element is on or adjacent said given area and upon energization of at least one of said conductor system and said movable element;

said conductor system comprising first and second conductor structures;

said first conductor structure comprising:

at least first, second and third conductors each of which include a plurality of active portions extending substantially in a first direction substantially in or adjacent a common plane substantially parallel to each other, adjacent active portions of the same conductor being separated by first spaces and adjacent active portions of all of said conductors being separated by second spaces; and means for coupling the spaced active portions of same conductors in series;

said first conductor structure having an extent in a second direction that is different from said first direction;

said second conductor structure comprising:

at least fourth, fifth and sixth conductors each of which include a plurality of active portions extending substantially in a first direction substantially in or adjacent a common plane substantially parallel to each other, adjacent active portions of the same conductor being separated by first spaces and adjacent active portions of all of said conductors being separated by second spaces; and means for coupling the spaced active portions of the same of said fourth, fifth and sixth conductors in series;

said second conductor structure having an extent in said first direction;

said conductors of said first conductor structure and said conductors of said second conductor structure being arranged in respective patterns such that for each pattern:

(a) at least two of said first spaces between adjacent active portions of at least one of said conductors are different;

(b) the maximum first space between any two adjacent active portions of the same conductor is less than one-half of said extent of said conductor structure; and (c) each of said second spaces between adjacent active portions or said active portions of all of said conductors may be uniquely identified by a unique binary number, respective binary digits of each of said unique binary numbers corresponding to respective conductors;

said apparatus including:

means for energizing one of said conductor system and said movable element to cause location-determining signals to be present in the other;

means for processing said location-determining signals in the other of said conductor system and said movable element, said processing means including first means for obtaining from said location-determining signals binary signals corresponding to said binary digits which identify said second spaces and are indicative of the location of said movable element relative to said given area.

38. The apparatus of claim 37 wherein, for each of said first and second conductor structures, said second spaces between adjacent conductor active portions of all conductors of the respective conductor structure are equal.

39. The apparatus of claim 38 wherein, for each of said first and second conductor structures, two adjacent active portions of the same conductor are separated by at least one active portion of another conductor.

40. The apparatus of claim 37 wherein said processing means includes means for storing sets of binary numbers corresponding to locations of said movable element relative to said given area, and means for comparing said stored sets of binary numbers and said binary numbers obtained from said binary signals to determine said location of said movable element relative to said given area.

41. The apparatus of claim 37 wherein said first means of said processing means determines a coarse location of said movable element from said binary numbers, said coarse location corresponding to a location of said movable element, with respect to each of said conductor structures, between two conductor active portions, said processing means including second means for determining a fine location of said movable element, with respect to each of said conductor structures, between said two conductor active portions or on one of them.

42. The apparatus claim 37 wherein, for each of said conductor structures, said processing means provides the amplitudes of said position-determining signals, and said second means performs a mathematical interpolation from selected amplitudes of selected position-determining signals.

43. The apparatus of claim 37 wherein said first and second conductor structures each comprises two additional conductors which each have a plurality of active portions extending substantially in said first or second direction, respectively, substantially in or adjacent said common plane substantially parallel to each other, said active portions of said two additional conductors being equally spaced with respect to adjacent active portions of both of said two conductors and equally spaced with respect to active portions of the same conductor, said second means processing position-determining signals in said two additional conductors for each of said first and second conductor structures to determine said fine location.

44. A method of determining a layout of a conductor structure of n conductors having the following characteristics:

each of said n conductors including a plurality of active portions extending substantially in a first direction substantially in or adjacent a common plane substantially parallel to each other, adjacent active portions of the same conductor being separated by first spaces and adjacent active portions of all of said conductors being separated by second spaces, and the spaced active portions of same conductors being coupled in series;

said conductors being arranged in a pattern such that the following conditions are satisfied:

(a) said conductors have N total active portions;

(b) the first space between any two adjacent active portions of the same conductor does not exceed a maximum value; and (c) each of said second spaces between adjacent active portions or said active portions of all of said conductors may be uniquely identified by a unique binary number;

said method comprising the steps of:

(1) inserting into said layout one of said conductors at a time such that at least two of said first spaces between adjacent active portions of at least one of said conductors are different;

(2) after each conductor is inserted into said layout, determining whether conditions (a)-(c) are satisfied;

(3) if conditions (a)-(c) are satisfied in step (2), repeating steps (1) and (2) for the next conductor until n conductors have been inserted into said layout;

(4) if conditions (a)-(c) are not satisfied in step (2), then removing the last conductor inserted into said layout and then repeating steps (1) and (2) for another conductor laid out differently from the removed conductor.

45. The method according to claim 44 wherein step (2) additionally determines whether said conductor structure layout satisfies the additional condition (d) that the first space between any two adjacent active portions of the same conductor is not less than a minimum value, wherein step (3) is performed if conditions (a)-(d) are satisfied, and wherein step (4) is performed if conditions (a)-(d) are not satisfied.

46. A method for determining the location of a movable element relative to a conductor structure which interacts with said movable element when said movable element is adjacent said conductor structure upon energization of at least one of said conductor structure and said movable element; said conductor structure comprising at least first, second and third conductors each of which includes at least three active portions extending substantially in a first direction substantially in or adjacent a common plane substantially parallel to each other, said conductors each having repeat increments which space adjacent active portions of the same conductor, the spaced active portions of same conductors being coupled in series;

said conductors being arranged in a pattern such that:

(a) each of said active portions of all of said conductors or spaces therebetween may be uniquely identified by a unique binary number, respective binary digits of each of said unique binary numbers corresponding to respective conductors, whereby upon interaction between said movable element and respective conductors binary logic signals may be obtained corresponding to said binary digits which are indicative of the location of said movable element relative to said conductor structure; and (b) the repeat increment of at least one of said conductors is non-uniform;

said method comprising the steps of:

energizing one of said conductor structure and said movable element; and processing signals obtained from the other of said conductor structure and movable element to provide a unique binary number which uniquely identifies a space or conductor active portion close to said movable element.

47. The conductor structure of claim 1, 2, 3 or 4 wherein, for each of said first, second and third conductors, two adjacent active portions of the same conductor are separated by at least one active portion of another conductor.

48. The conductor structure of claim 1, 2, 3 or 4 wherein, for each of said first, second and third conductors, said conductor active portions are equally spaced.

49. The conductor structure of claim 1, 2, 3 or 4 wherein each of said first, second and third conductors has a first end and a second end, the first ends of said conductors being uniquely addressable and the second ends of said conductors being coupled together.

50. The appearance of claim 7 wherein, for each of said first, second and third conductors, two adjacent active portions of the same conductor are separated by at least one active portion of another conductor.

51. The apparatus of claim 7 wherein, for each of said first, second and third conductors, said conductor active portions are equally spaced.

52. The apparatus of claim 7 wherein each of said first, second and third conductors has a first end and a second end, the first ends of said conductors being uniquely addressable and the second ends of said conductors being coupled together.

53. The system of claim 10 wherein, for each of said first through sixth conductors, two adjacent active portions of the same conductor are separated by at least one active portion of another conductor.

54. The system of claim 10 wherein, for each of said first through sixth conductors, said conductor active portions are equally spaced.

55. The system of claim 10 wherein each of said first through sixth conductors has a first end and a second end, the first ends of said conductors being uniquely addressable and the second ends of said first, second and third conductors being coupled together and the second ends of said fourth, fifth and sixth conductors being coupled together.

56. The apparatus of claim 13 wherein, for each of said first through sixth conductors, two adjacent active portions of the same conductor are separated by at least one active portion of another conductor.

57. The apparatus of claim 13 wherein, for each of said first through sixth conductors, said conductor active portions are equally spaced.

58. The apparatus of claim 13 wherein each of said first though sixth conductors has a first end and a second end, the first ends of said first through sixth conductors being uniquely addressable and the second ends of said first, second and third conductors being coupled together and the second ends of said fourth, fifth and sixth conductors being coupled together.

59. The conductor structure of claim 16 wherein said maximum space between any two adjacent active portions of the same conductor is determined in relation to desired noise immunity.

60. The conductor structure of claim 16 wherein said conductors are arranged in a pattern such that there is a minimum space between any two adjacent active portions of the same conductor or there is a maximum change in first spaces between any two adjacent active portions of the same conductor, or both, which space and change are determined in consideration of approximate linear mathematical interpolation of the movable device relative to said conductor structure.

61. The apparatus of claim 21 wherein said maximum space between any two adjacent active portions of the same conductor is determined in relation to desired noise immunity.

62. The apparatus of claim 21 wherein said conductors are arranged in a pattern such that there is a minimum space between any two adjacent active portions of the same conductor or there is a maximum change in first spaces between any two adjacent active portions of the same conductor, or both, which space and change are determined in consideration of approximate linear mathematical interpolation of the movable device relative to said conductor structure.

63. The conductor system of claim 29 wherein for each conductor structure said maximum space between any two adjacent active portions of the same conductor is determined in relation to desired noise immunity.

64. The conductor system of claim 29 wherein said conductors of each of said conductor structures are arranged in a pattern such that there is a minimum space between any two adjacent active portions of the same conductor or there is a maximum change in first spaces between any two adjacent active portions of the same conductor, or both, which space and change are determined in consideration of approximate linear mathematical interpolation of the movable device relative to the respective conductor structure.

65. The apparatus of claim 37 wherein for each conductor structure said maximum space between any two adjacent active portions of the same conductor is determined in relation to desired noise immunity.

66. The apparatus of claim 37 wherein said conductors of each of said conductor structures are arranged in a pattern such that there is a minimum space between any two adjacent active portions of the same conductor or there is a maximum change in first spaces between any two adjacent active portions of the same conductor, or both, which space and change are determined in consideration of approximate linear mathematical interpolation of the movable device relative to the respective conductor structure.

* * * * *